United States Patent [19]

Foung et al.

[11] Patent Number: 5,249,056
[45] Date of Patent: Sep. 28, 1993

[54] APPARATUS FOR GENERATING VIDEO SIGNALS FROM FILM

[75] Inventors: Paul Foung, Dumont, N.J.; John R. Lee; Erhan H. Gunday, both of New York, N.Y.; Michael Doliton, Maywood, N.J.

[73] Assignee: Sony Corporation of America, Park Ridge, N.J.

[21] Appl. No.: 731,079

[22] Filed: Jul. 16, 1991

[51] Int. Cl.⁵ .................. H04N 3/36; H04N 5/335
[52] U.S. Cl. ....................... 358/214; 358/97
[58] Field of Search ............. 358/215, 214, 97, 54, 358/216; 354/173.11, 21

[56] References Cited

U.S. PATENT DOCUMENTS

| | | | |
|---|---|---|---|
| 4,394,688 | 7/1983 | Iida et al. | 382/54 |
| 4,437,742 | 3/1984 | Taniguchi | 354/21 |
| 4,443,084 | 3/1987 | Harada et al. | 354/173.11 |
| 4,688,099 | 8/1987 | Funston | 358/214 |
| 4,710,818 | 12/1987 | Inatsuki | 358/215 |
| 5,036,398 | 7/1991 | Westell | 358/215 |

FOREIGN PATENT DOCUMENTS

| | | |
|---|---|---|
| 2048870 | 2/1990 | Japan . |
| 2-295374 | 12/1990 | Japan . |
| 8905554 | 6/1989 | World Int. Prop. O. . |
| 8906890 | 7/1989 | World Int. Prop. O. . |

Primary Examiner—Michael T. Razavi
Assistant Examiner—Wendy R. Greening
Attorney, Agent, or Firm—William S. Frommer; Alvin Sinderbrand

[57] ABSTRACT

An apparatus for generating video signals from a photographic image previously recorded on film (a cine-video system) which includes a film transport mechanism for advancing or rewinding the film in order to position a film frame at a film gate for projection, an image projector which detects when a film frame is positioned at the film gate and projects an illuminated image of that frame, a video pickup system which receives the image and generates a video signal which represents it, and an output circuit which produces a resultant output video signal.

11 Claims, 12 Drawing Sheets

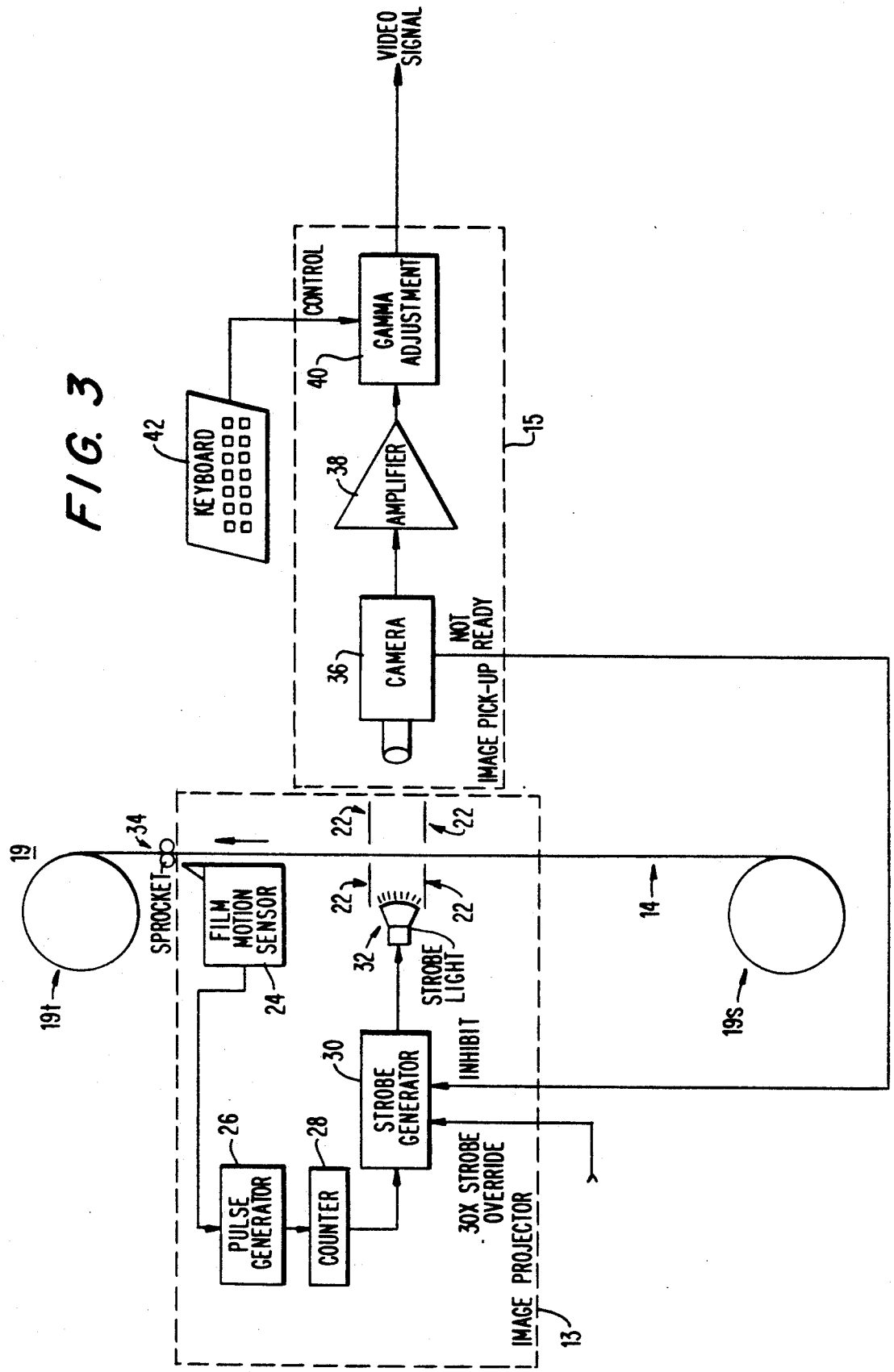

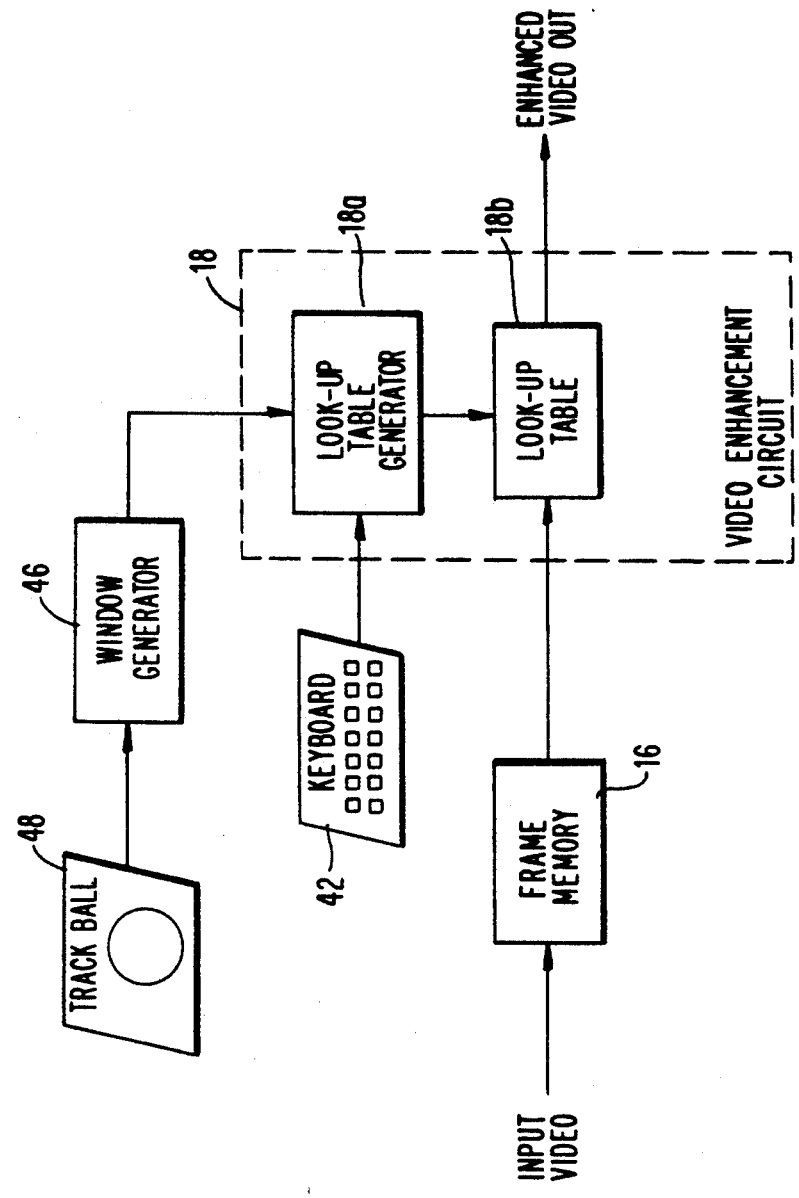

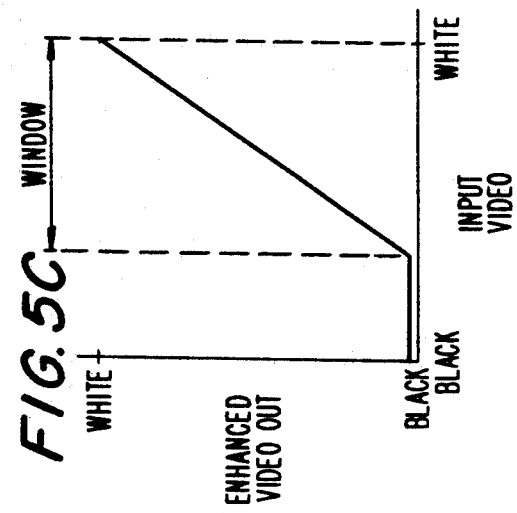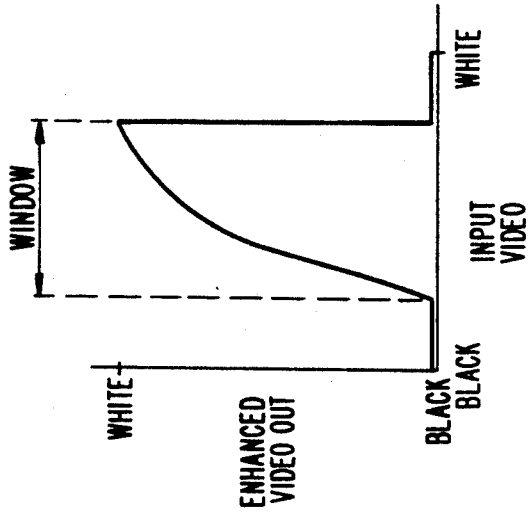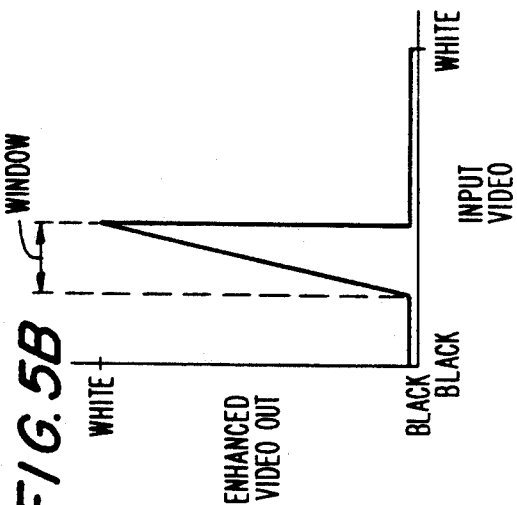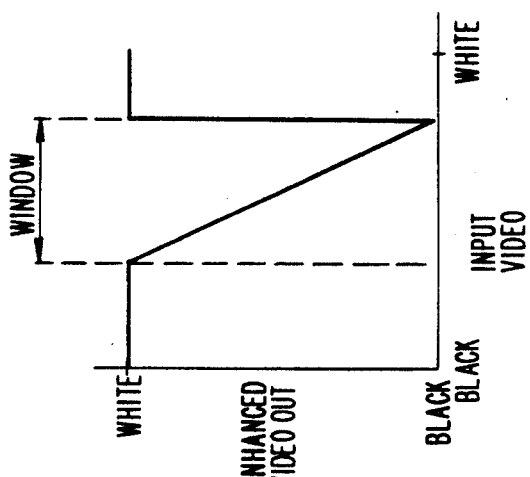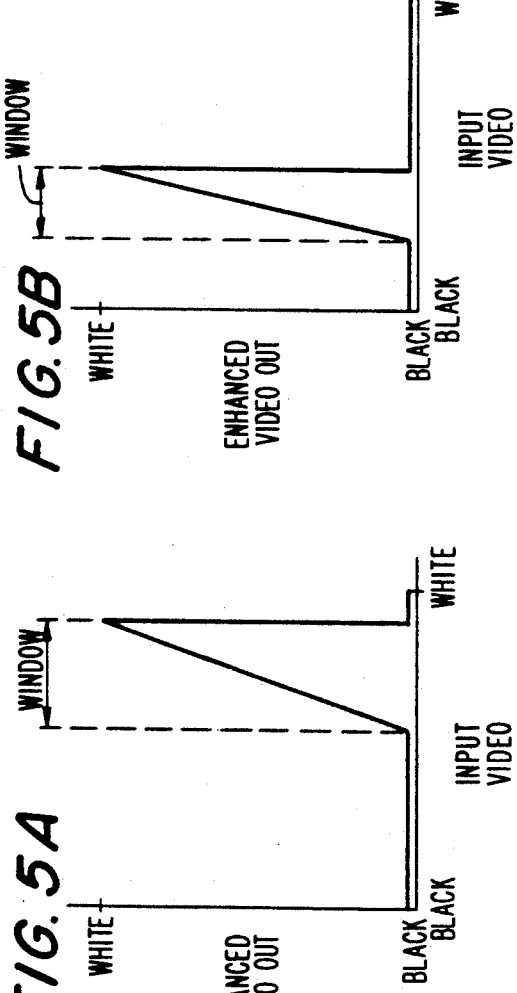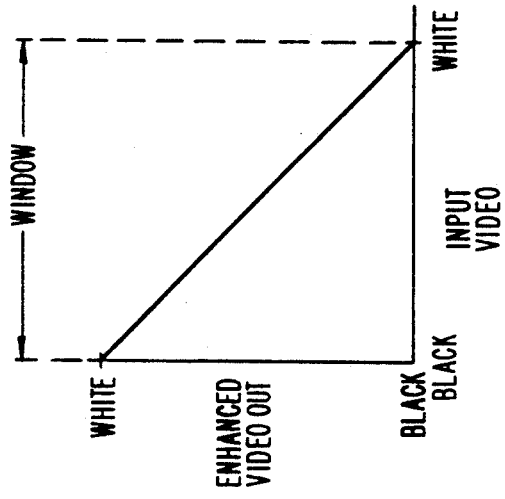

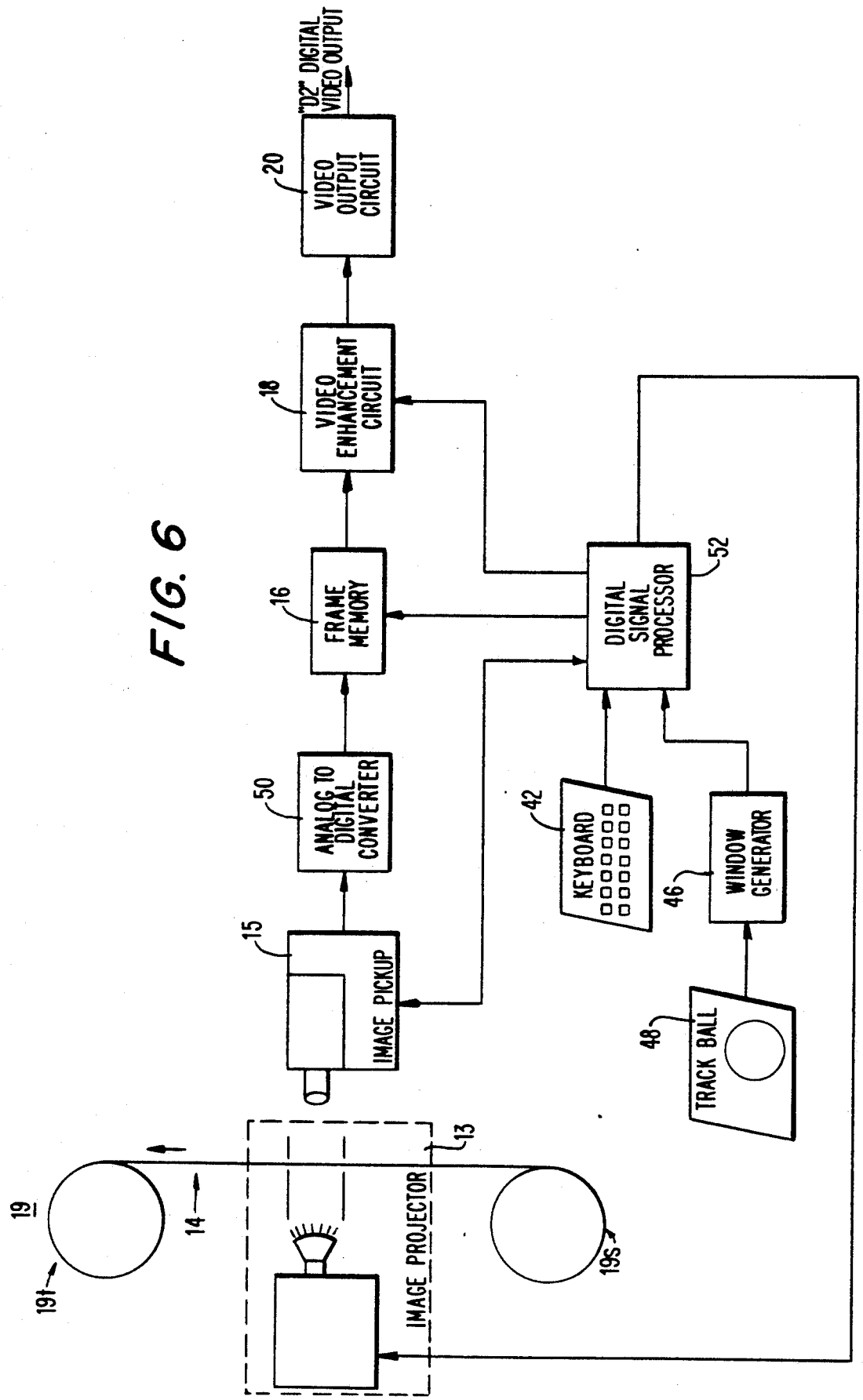

APPARATUS FOR GENERATING VIDEO SIGNALS FROM FILM

BACKGROUND OF THE INVENTION

This invention relates to apparatus for viewing photographic images previously recorded on a film-type medium and, more particularly, to such apparatus which converts film frame images to video signals for display on a video monitor, also known as a cine-video conversion system.

Film viewing mechanisms having general application such as film projection systems are well known to those of ordinary skill in the art, particularly in the field of cinematography or the like. These systems include a film transport mechanism and a projection mechanism, and typically project an illuminated image of one film frame at a time on a viewing screen or an empty wall. A constant image of one particular film frame may be viewed (as in a slide projector), or, more commonly, these systems are used to view images in motion. In particular, motion of the viewed image may be perceived by the viewer as a result of the repetitive projection of successive film frames which were originally recorded on the film in rapid succession.

Film projection systems, however, suffer from several drawbacks and limitations. One such drawback is the problem of limited brightness, familiar to anyone who has been to a movie theater. This problem is inherent in the process of projecting light over a significant distance. Another limitation of merely projecting the light image of the film frame is the fact that since the image is never "captured" by the system, either electronically or otherwise, there is no possibility of processing or modifying the image to improve its quality or its usability.

Recently, cine-video systems which convert the images recorded on film to video signals in real time have been introduced as an alternative to standard film projectors. With this type of system, the film frame images are electronically "captured", so as to be represented by electronic signals. These signals may be processed, if desired, and ultimately, they are displayed on a standard video monitor, thereby eliminating some of the drawbacks of projected images. The basics of such a cine-video system include a film transport mechanism, by which the film is loaded into the system and by which each film frame image is positioned for projection, a projection mechanism, by which the film frame image thus positioned is projected onto a video camera lens by an illuminating light source, and a video camera, by which the projected image is captured and converted to an electronic video signal.

One application of film viewing systems in general, and cine-video systems in particular, is in the medical field, and, more particularly, angiography, such as in a cardiac catheterization laboratory for producing high resolution displays on a standard video monitor from 35mm angiographic film. In this application in particular, the lack of numerous quality and usability features, not heretofore present in either film projectors or prior cine-video systems, limits the value of these prior systems. For example, one of the major limitations of prior systems is the inability to provide for a continuously variable viewing speed (i.e., the number of consecutive film frames scanned by the film transport mechanism per second). In particular, although many of these systems allow for the viewing of motion at a few different film speeds, they generally do not provide for continuously variable speed viewing, as may be desired by the user, without loss of resolution.

Another drawback of the prior systems is their inability to electronically enhance the quality or usability of the video image. For example, and particularly in medical applications, it is often the case that the visibility of detail in the dark areas of high contrast pictures is limited. Electronic image enhancement techniques in which certain differences in brightness can be accentuated so as to provide more visibility of detail are not provided by prior systems. Although prior cine-video systems capture the image electronically and are therefore not inherently restricted from providing such capabilities as are mere film projectors, none have done so to date.

Yet another drawback of the prior systems is their high cost and inflexibility relative to the capabilities and features they provide. The manufacturing cost of mechanical designs and analog electrical circuitry implementation is far higher than the cost of digital electronics performing comparable functions. Moreover, the use of digital, programmable processors and associated software not only further reduces the cost, but also provides vastly superior flexibility, in that system functions can be added, replaced or modified easily and inexpensively. None of the prior commercially available film viewing systems, neither film projectors nor prior cine-video systems, are implemented as digital systems controlled by programmable digital processors.

A further drawback of prior systems is the lack of a direct digital video signal output, and particularly real time digital output, useful for applications such as recording on a digital VCR (video cassette recorder) or for data analysis. Whereas mere film projectors by themselves clearly cannot provide any output other than the viewable image itself, cine-video systems typically do provide video signal outputs. However, the prior cine-video systems do not provide any such output put in a digital video format.

Yet another drawback of prior systems is the lack of a "Hi-line" video signal output, which allows for the images to be viewed on a multi-scan monitor for improved quality. A Hi-line video signal provides for twice the standard number of scan lines, and thereby increases the image brightness as well as the apparent resolution, and further reduces the noticeability of raster scan lines. Again, whereas mere film projectors cannot provide output signals at all, cine-video systems do; however, the prior commercially available cine-video systems have provided only standard video signal outputs.

A still further drawback of prior systems is their inability to include user-locatable "cursor" marks overlaid on the image being viewed. Particularly in medical applications, and particularly when an image is being viewed and discussed by more than one medical professional, it is often useful to be able to precisely identify one or more points of particular interest on the image. Prior film viewing systems provide no mechanism for overlaying such identifying marks on the image, and therefore manual, imprecise tools, such as a hand-held pointer, must be used.

Yet another drawback of prior systems is the lack of any ability to provide measurement information regarding the distance between a pair of points on the subject of the image being viewed. Particularly in medical applications such as angiography, portions of the images viewed represent vessels or other anatomical elements whose absolute size or size relative to other elements is of critical importance. Prior film viewing systems provide no mechanism for making such measurements accurately, and therefore a combination of guesswork and manual, imprecise tools (e.g., a ruler used to measure portions of the viewed image itself) must be used.

Still another drawback of prior systems is the lack of an electronically controlled zoom capability for increasing and decreasing the magnification of the image being viewed. Prior systems have provided only imprecise, manual zoom capabilities, if at all.

These aforementioned drawbacks of prior film viewing systems, both film projectors and prior cine-video systems, reduce the effectiveness and flexibility with which one may view and make use of photographic images recorded on film. Particularly in medical applications such as angiography, the elimination of these drawbacks can provide for a far more powerful tool for film viewing and analysis for the professional user.

OBJECTS OF THE INVENTION

Therefore, it is an object of the present invention to provide an improved apparatus for viewing photographic images previously recorded on film, in particular, a cine-video system, which overcomes the aforementioned drawbacks and limitations associated with prior art film viewing apparatus.

Another object of this invention is to provide improved apparatus which permits film to be viewed in motion at continuously variable speeds without loss of resolution.

Another object of this invention is to provide cine-video apparatus in which the quality or usability of an image is enhanced by accentuating certain differences in brightness in order to provide improved visibility of detail.

A further object of this invention is to provide cine-video apparatus of low cost and high flexibility relative to its capabilities, by the use of digital electronics in general, and digital, programmable processors and associated software, in particular.

A still further object of this invention is to provide cine-video apparatus which includes a digital video signal output for use in recording on a digital VCR, for data analysis or for archiving purposes.

Still another object of this invention is to provide cine-video apparatus which includes a Hi-line video signal output containing twice the standard number of scan lines for improved viewing quality.

An additional object of this invention is to provide cine-video apparatus having user-locatable cursor marks overlaid on the image being viewed, in order to accurately locate and identify points of particular interest.

Yet a further object of this invention is to provide cine-video apparatus which includes the ability to provide measurement information regarding the distance between a pair of points on the subject of the image being viewed.

Still another object of this invention is to provide cine-video apparatus which includes an electronically controlled zoom capability for increasing or decreasing the magnification of the image being viewed.

Various other objects, advantages and features of the present invention will become readily apparent from the ensuing detailed description, and the novel features will be particularly pointed out in the appended claims.

SUMMARY OF THE INVENTION

In accordance with this invention, an apparatus for generating video signals from a photographic image previously recorded on film (a cine-video system) is provided, which includes a film transport mechanism for advancing or rewinding the film in order to position a film frame at a film gate for projection, an image projector which detects when a film frame is positioned at the film gate and projects an illuminated image of that frame, a video pickup system which receives the image and generates a video signal which represents it, and an output circuit which produces a resultant output video signal. Thus, a new image is received and a new video frame is generated, when a new film frame is positioned in the film gate.

As one aspect of this invention, the image projector is inhibited from projecting an illuminated image when the video pickup system is not ready to receive a new image. In this manner, the integrity of each image is assured, regardless of the speed with which the film transport mechanism is advancing or rewinding the film.

As another aspect of this invention, the image projector repetitively projects an illuminated image of the same film frame when the film transport is holding the film frame fixed at the film gate but various user adjustments are being made to the resultant image. This aspect enables the viewer to see the effects of these adjustments, even though the system is in a "still frame mode."

As yet another aspect of this invention, the video pickup system includes provisions for the enhancement of the resulting video signal. This enhancement capability includes user-selectable gamma adjustment functions which accentuate the differences in brightness in the darker regions of the image, while compressing the differences in the brighter regions. This allows for greater visibility of detail in high contrast images.

Still another aspect of this invention provides a cine-video system which includes an image pickup system which receives a projected image and generates video signals which represent that image, a window generating capability with which the user can define a range of video signal values within which an enhancement of video signals is to be performed, and an enhancement capability which performs that enhancement. This user-selectable enhancement capability includes, for example, the ability to accentuate the differences in brightness within the given range of video signal values by "stretching" this range of values into the full range of brightness values. Thus, the visibility of detail in a portion of the image of particular interest can be improved. Also included is the ability to invert the polarity of the image, thereby creating a "negative" image, and the ability to perform a gamma adjustment within a selected window.

As yet another aspect of this invention, a cine-video system is provided which includes an image pickup system which receives a projected image and generates video signals which represent that image, a digitizer to convert these video signals to digital form, a memory for storing a video frame of digitized signals, an enhancement capability which enhances the digitized video signals if desired, and a digital signal processor which controls the image pickup system, memory and enhancement capability. By providing for a programmable, digital system, costs are reduced and flexibility is increased. This digital system may further include an output circuit which produces a video output in digital format.

Still another aspect of this invention is to provide a digital cine-video system which includes an optical zoom capability for zooming in and out on the image. By changing the magnification of the image in this manner, a particular area of detail may be examined more closely. The zoom capability is under the control of the digital signal processor.

Another aspect of this invention is to provide a digital cine-video system which includes an optical panning capability for panning the image. By using this feature in combination with the optical zoom capability, any portion of the image may be examined in detail. The panning capability is under the control of the digital signal processor.

As yet another aspect of this invention, a cine-video system is provided which includes an image pickup system which receives a projected image and generates video signals which represent that image, a memory in which the individual scan lines from the separate field intervals of the video signals generated for each film frame are separately stored, read-out circuitry by which the scan lines are read from the memory at twice the standard line repetition rate, and combining circuitry for selectively combining these lines of video signals from successive field intervals of at least one video frame to produce a resultant frame of video signals formed of twice the standard number of scan lines. Thus, a "Hi-line" video signal is provided for use with video monitors which provides a significant increase in apparent resolution and reduces the noticeability of raster scan lines.

Another aspect of this invention is to provide a cine-video system which includes an image pickup system which receives a projected image and generates video signals which represent that image, a memory for storing a video frame, cursor generation circuitry for selectively generating one or more cursors, and circuitry to combine the video signals for the video frame with cursor signals to generate video signals which represent the image with one or more cursor overlays superimposed on the image. In this manner, a user may place cursors on the image at points of particular interest, for identification or discussion.

As still another aspect of this invention, the cine-video system includes a measurement capability with which the distance between two locations in the subject of the image can be determined by placing a cursor on the point in the image which corresponds to each such location. In one embodiment a calibration capability is provided for relating physical distances between locations in the subject of the image with distances in the image itself, thereby determining actual distance between the locations identified by the cursors. As an alternative, the measurement provides only relative distance information by comparing the distance between two locations in the subject of the image with the distance between another two such locations.

BRIEF DESCRIPTION OF THE DRAWINGS

The following detailed description, given by way of example, will best be understood in conjunction with the accompanying drawings in which:

FIG. 3 provides a more detailed description of the image projector and image pickup system;

FIG. 4 is a block diagram which provides a more detailed representation of the video enhancement circuit;

FIG. 5A–5F graphically illustrate several examples of useful enhancement functions provided for by the preferred embodiment of the video enhancement circuit;

FIG. 6 is a block diagram of a preferred embodiment of the present invention which is implemented as a digital video system under the control of a digital signal processor;

DETAILED DESCRIPTION OF THE PREFERRED EMBODIMENT

Figure 1:
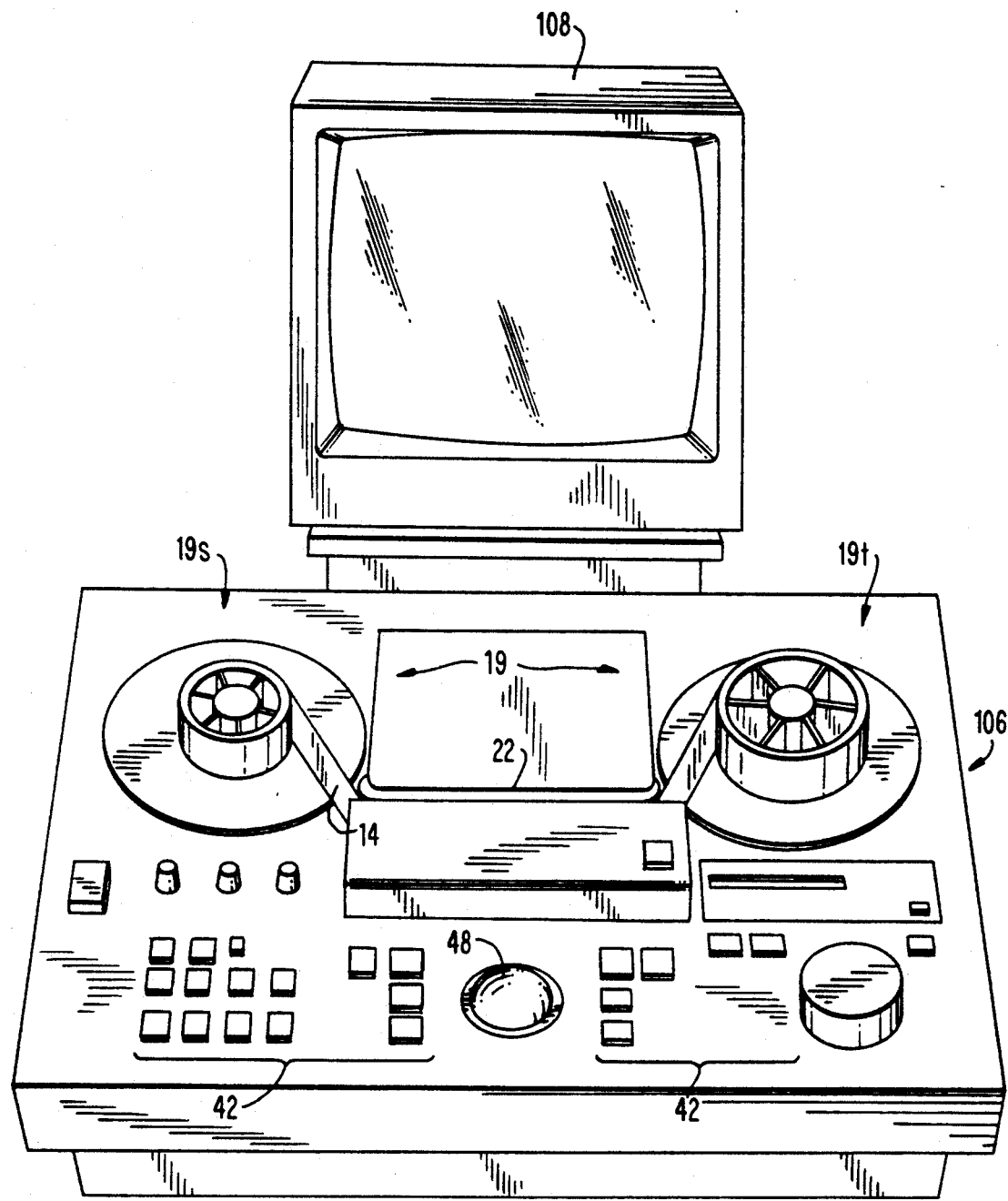
FIG. 1 is a perspective view of a cine-video system in which the present invention finds ready application.

Referring now to the drawings, wherein like reference numerals are used throughout, and in particular to FIG. 1, there is illustrated an apparatus for generating video signals from film in which the present invention finds ready application. The purpose of this cine-video system is to generate video signals representing photographic images previously recorded on conventional photographic medium, such as on conventional 35mm photographic film. The illustrated cine-video system is particularly useful in angiography, such as in the environment of a cardiac catheterization laboratory; and the photographic images typically represent X-ray images of, for example, the cardiac system. It will be appreciated that the information represented by such X-ray or photographic images is not critical to the present invention.

The illustrated cine-video system is comprised of a console 106 which houses a film transport assembly 19, a keyboard 42, a track ball 48, and a video imaging subsystem, and a separate video monitor 108. The film transport assembly is adapted to move film 14 bidirectionally between a supply reel 19s and a take-up reel 19t through a film gate 22 which defines an imaging station at which is positioned an optical image projector and a video image pickup device, such as a CCD camera or the like. The manner in which the film transport assembly operates forms no part of the present invention per se; but is the subject of copending application Ser. No. 730,539 and is described more fully therein. As each photographic film frame is transported through the film gate, an optical image thereof is projected to the image pickup camera which generates video signals corresponding thereto; and these video signals are processed, stored and enhanced, and then displayed on monitor 108.

The video monitor may comprise a conventional NTSC monitor, a multi-scan monitor or a high resolution monitor operable to display a video image comprised of twice the conventional number of horizontal raster lines which constitute a standard video image. The video image displayed on the monitor may appear as a moving image if film 14 moves between the supply and take-up reels; or the image may be displayed as a still image if film 14 is stationary (still frame mode). The manner in which video signals are generated to produce a video image comprises the present invention, and is described in detail below.

Figure 2:
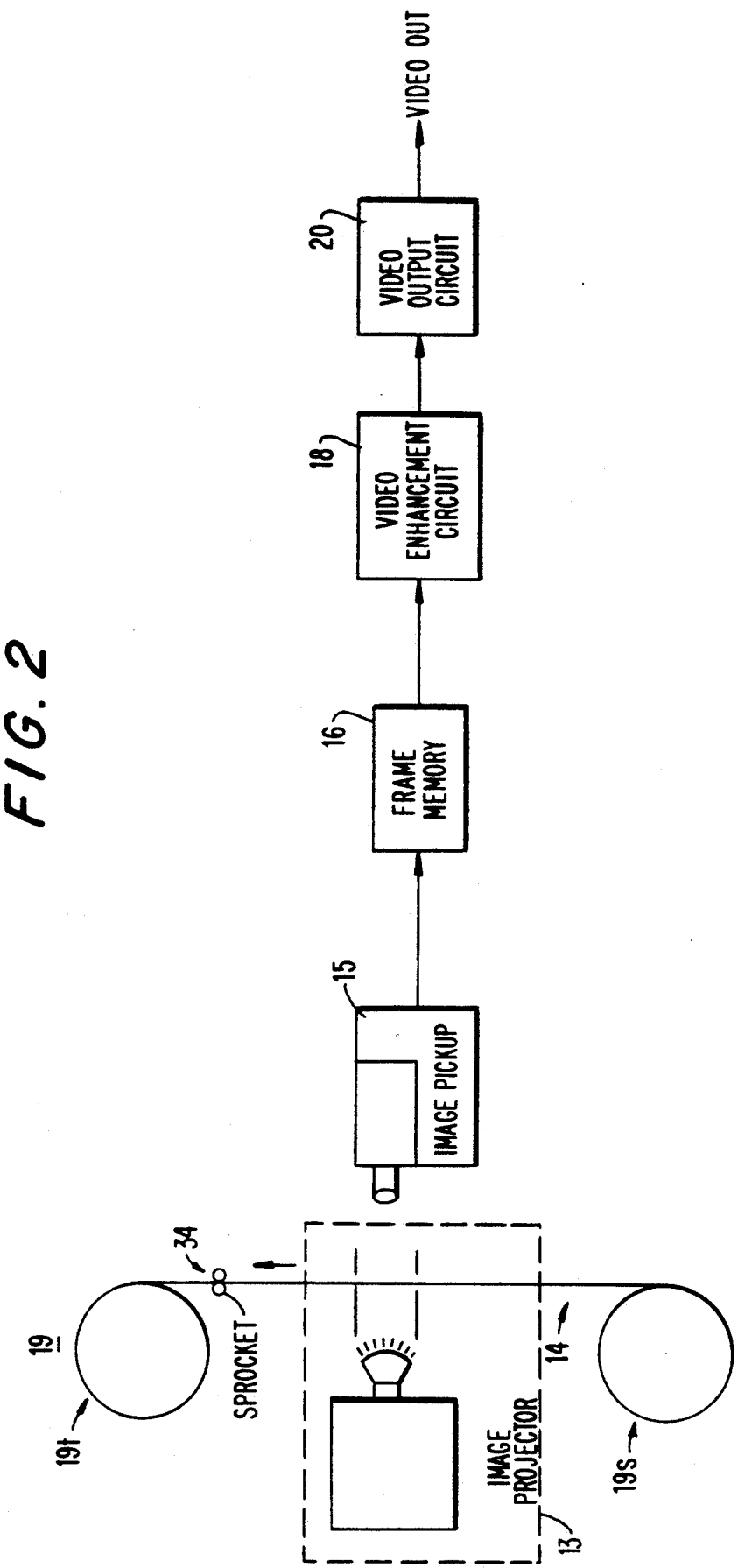
FIG. 2 is a block diagram of a cine-video system according to the present invention.

FIG. 2 is a block diagram of an apparatus for generating video signals and video images from a photographic image previously recorded on a film-type medium in which the present invention finds ready application. The illustrated apparatus is comprised of a film transport mechanism 19 on which are mounted a supply reel 19s containing film 14 to be viewed and a take-up reel 19t, a sprocket 34, an image projector 13, an image pickup system 15, a frame memory 16, a video enhancement circuit 18, and a video output circuit 20.

Film transport mechanism 19, which is described in greater detail in the aforementioned copending application, is adapted to advance or rewind film 14 by the coordinated rotation of supply reel 19s, take-up reel 19t and sprocket 34. The film has recorded thereon a series of uniformly spaced image frames. A supply reel motor functions to drive the rotation of the supply reel and a take-up reel motor functions to drive the rotation of the take-up reel for forward or backward movement of the film. Sprocket 34, which is physically coupled to the usual sprocket holes of film 14 is driven by a sprocket motor.

Image projector 13 is optically coupled to film transport mechanism 19, and is adapted to project, for a transitory duration, an illuminated image of a film frame, one frame at a time. According to a preferred embodiment of the present invention, the image projector projects an image when film 14 has been advanced or rewound by an amount equal to an integral number of film frames. Preferably, image projector 13 is comprised of a film motion sensor which detects the motion of sprocket 34, and thereby detects the motion of film 14. Analysis circuitry responds to the measured motion of film 14 to determine that the next film frame is in proper position to be projected and thereby triggers a strobe light, which generates a flash of light at the proper time. In an alternative embodiment of the invention, the strobe light may be replaced by a shuttering mechanism which provides for the illumination of the film frame from a constant light source for a transitory duration. The shuttering mechanism may be any of a number of varieties known to those of ordinary skill in the art, such as electronic shuttering, LCD (liquid crystal diode) shuttering, gated image intensifying, or the like. In any event, according to the present invention it is preferable that the illuminated image of a single film frame be projected for a transitory duration, regardless of the means used to accomplish this.

Image pickup system 15 is optically coupled to image projector 13 and is adapted to receive the illuminated image of the film frame produced by image projector 13 and to generate a video signal representing that image. The image pickup system is comprised of a video camera which receives and captures the light image to produce a video signal output. In the preferred embodiment, the video signal output is subjected to a gamma adjustment function, and an analog-to-digital converter provides a digital data representation of the captured image. Preferably, the video camera is a standard CCD (charge coupled device) video camera, but alternatively it may be any other conventional video camera familiar to those of ordinary skill in the art.

Gamma adjustment, which according to the present invention may or may not be present, is intended to improve the quality of the video image by stretching the black region of the gray level (brightness) scale, while compressing the white region. Circuits which perform various gamma adjustment functions are familiar to those of ordinary skill in the art, but, in the preferred embodiment of the present invention, not only is such a circuit included, but the specific gamma adjustment function to be performed on the video signal is user-selectable from a predetermined plurality of adjustment functions.

Frame memory 16 is electrically coupled to image pickup system 15 and is adapted to store the video data supplied by the image pickup system which represents the video image of a single film frame produced in a response to a triggered strobe light. In the preferred embodiment of the present invention, this memory is implemented with standard video field memories, but standard RAM (random access memory) devices or other digital or analog storage devices familiar to those of ordinary skill in the art may be used in other embodiments.

Video enhancement circuit 18 is electrically coupled to frame memory 16 and is adapted to increase the usefulness of the video images to be viewed by modifying the images in various user-selectable ways so that important features of the image can be viewed more clearly. In the preferred embodiment of the present invention, the video enhancement circuit is comprised of a set of look-up tables adapted to convert the video data as it is read out of frame memory 16 into enhanced data, wherein the look-up tables are implemented with standard RAM. Alternatively, this data conversion may be accomplished with look-up tables or other circuitry implemented by alternate circuit arrangements such as ROMs (read-only memories), PALs (programmable logic arrays), or other programmable or non-programmable circuits familiar to those of ordinary skill in the art. In addition, this data conversion may be performed partially or entirely by software executed on either a conventional general purpose or special purpose processor. In any event, according to the present invention, data enhancement is an optional, but desirable, feature for modifying the digital frame data representing the image of a film frame.

Video output circuit 20 is electrically coupled to video enhancement circuit 18 and is adapted to produce one or more video output signals in a respective format for display on various types of video monitors or for other use, such as for recording by a digital VCR (video cassette recorder). In the preferred embodiment of the present invention, a standard format RS-170 composite video signal at a standard 525/60 Hz line rate (i.e., 525 scan lines each 1/30th of a second), a "Hi-line" composite video signal at twice the standard line rate (1050 scan lines each 1/30th of a second), and a standard "D-2" format digital video output signal are produced. Other embodiments may produce other standard or non-standard video output signals useful for video display, video recording or video analysis.

Preferably, video output circuit 20 is comprised of a digital to analog converter to convert the digital frame data back to analog form, together with circuitry to add composite synchronizing and blanking signals to both the RS-170 video signal and the "Hi-line" video signal. Circuitry to provide for user control of the video image brightness level may also be included. In addition, a frame doubling memory may be provided to store digital image data for two successive film frames for use in the creation of the "Hi-line" video signal as will be described further below.

In operation of the illustrated apparatus, film transport mechanism 19 positions film 14 so t hat image projector 13 projects, for a transitory duration, a light image of a single film frame onto the lens of the camera included in image pickup system 15. In particular, image projector 13 projects the light image of the given film frame for a brief period of time sufficient to enable the video camera of image pickup system 15 to capture and temporarily store that image.

Image pickup system 15, after capturing a video image, converts the captured image into data which represents that image, and which, in the preferred embodiment of the present invention, is in digital form. This digital data is supplied to frame memory 16, which stores and holds the data until data representing another video image is supplied by image pickup system 15.

Next, video enhancement circuit 18 enhances the video image if the system user so requests (as will be described), by modifying the data stored in frame memory 16 in order to provide resultant video images in which various features of the film frame to be displayed can be viewed more clearly. In the preferred embodiment of the present invention, the data is modified as it is read out of frame memory 16, but alternatively, the modified data stored in the frame memory may be either modified in-place therein, or stored in a different memory after modification to be subsequently read out. Examples of enhancements which video enhancement circuit 18 performs include conversion of the data to represent a negative, rather than a positive, image. In addition, those portions of the video image which have gray levels of brightness outside of a user-selectable range may be suppressed, while those portions having gray levels within the range may be mapped onto different levels in such a manner as to enhance the distinctiveness between the levels within the range (i.e., the gray levels may be stretched). After the video data is processed by video enhancement circuit 18, video output circuit 20 converts the enhanced data to one or more video output signals for display on various types of video monitors or for recording, as by a digital VCR.

It will be appreciated that the system described herein is capable not only of producing a viewable video image of a single film frame in still motion, but may also be used to produce viewable video images of a succession of film frames driven in forward or reverse motion and at varying film speeds. In particular, film transport mechanism 19 may be operated to advance or rewind film 14 at a user-selectable speed, and image projector 13 may, as a result, repeatedly cause images of successive film frames to be projected to image pickup system 15 one at a time, as each film frame passes the proper location or imaging station for projection, for example, a film gate. In this manner, frame memory 16 operates to store a succession of different film frames. Meanwhile, however, the contents of frame memory 16 may be read out in an asynchronous manner with respect to the successive storing of these frames. In particular, frames of video data are read out of frame memory 16 at the standard video viewing rate of 30 frames per second, thereby allowing them to be displayed in succession on a standard video monitor by video output circuit 20, even though 30 film frames per second are not necessarily imaged onto image pickup system 15.

It will be further appreciated that the series of multiple film frames projected by image projector 13 and thereby ultimately displayed on a video monitor may or may not be immediately successive frames as recorded on film 14. Since at most 30 frames per second are processed by image pickup system 15 in the preferred embodiment, and data from frame memory 16 is read out at 30 frames per second, image projector 13 is inhibited in the preferred embodiment from projecting images at a faster rate. Therefore, the image projection of some film frames will be skipped when film 14 is being advanced or rewound at a speed greater than 30 frames per second. When film 14 is advanced or rewound at a speed less than 30 frames per second, on the other hand, frame memory 16 may be read out multiple times for the same stored film frame image. Thus, when film transport mechanism 19 advances or rewinds film 14 at any given speed, the user may view a progression of frames, that is, a motion picture, moving in the corresponding direction and at the corresponding speed as the film.

FIG. 3 provides a more detailed description of image projector 13 and image pickup system 15 according to the preferred embodiment of the present invention. In particular, the illustrated image projector is comprised of a film gate 22, a film motion sensor 24, a pulse generator 26, a counter 28, a strobe generator 30, and a strobe light 32. The illustrated image pickup system is comprised of a camera 36, an amplifier 38, and a gamma adjustment circuit 40, which is responsive to activation of a keyboard 42.

Film gate 22 is physically coupled to film 14, and is adapted to provide a pathway by which an illuminated image of a film frame, accurately positioned in the film gate, may be projected onto the lens of camera 36.

Film motion sensor 24 is coupled to sprocket 34 and is adapted to sense and measure the rotation of sprocket 34, and thereby determine the direction and amount by which film 14 has moved relative to film gate 22. According to a preferred embodiment of the present invention, the film motion sensor is comprised of an electronic encoder which generates quadrature pulse signals wherein the relative phase of the pulses (i.e., which one of paired quadrature pulses precedes the other) indicates the direction of rotation of sprocket 34, and the frequency of these pulses indicates the speed of rotation of the sprocket. Alternatively, the directional and speed information may be encoded in any other manner familiar to those of ordinary skill in the art.

Pulse generator 26 is electrically coupled to film motion sensor 24 and is adapted to convert the signals supplied by the film motion sensor into counter control pulses which are used to determine the precise relative location of a film frame of film 14 within film gate 22. In the preferred embodiment of the present invention, the pulse generator converts the quadrature pulse signals supplied by film motion sensor 24 into an individual up-count signal and a down-count signal for use by an up/down counter, and is implemented with a programmable logic device (in particular, a PAL). Alternatively, other logic circuitry familiar to those of ordinary skill in the art may be used.

Counter 28 is electrically coupled to pulse generator 26 and is adapted to count pulses supplied by the pulse generator in order to determine when a film frame of film 14 is precisely located at film gate 22. In the preferred embodiment of the present invention, the counter is implemented by a standard up/down counter, such as a Texas Instruments 74LS193, but, alternatively, the counter may be implemented by other logic circuitry familiar to those of ordinary skill in the art, or the counting function may be performed partially or entirely by software executed on either a conventional general purpose or special purpose processor.

Strobe generator 30 is electrically coupled to counter 28 and camera 36, and is adapted to generate a strobe pulse of a precise, transitory duration in order to illuminate a strobe light so that a light image of a film frame is projected onto the camera lens for that transitory duration. The strobe generator may be implemented by any fixed-width pulse generator familiar to those of ordinary skill in the art, such as a "one-shot" circuit (monostable multivibrator).

In a preferred embodiment of the present invention, strobe generator 30 includes an inhibit input which, when activated, provides for the suppression of the generation of a strobe pulse when camera 36 is not ready to receive a new image. Where camera 36 is a conventional CCD video camera providing NTSC standard video signals, as it is in the preferred embodiment, such a state of unreadiness may occur, for example, during a brief portion of the vertical blanking period of the NTSC standard when the camera is in the process of loading its internal memory from its CCD pickup elements. At that time, the camera is unable to capture an image, and therefore the strobe is inhibited. As another example, the strobe is inhibited during a portion of the period following the point in time when the previous image has been captured (i.e., since the last strobe), while the camera is reading out the previously captured video data. Otherwise, if the camera captures another image, it would likely corrupt the integrity of the data being read out. The implementation of this inhibit signal for both purposes will be obvious to those of ordinary skill in the art, and may be generated, directly or indirectly, by camera 36.

Furthermore, according to a preferred embodiment of the present invention, pulse generator 30 also includes a 30× strobe override signal input. This signal, activated when film 14 is stationary relative to film gate 22 (still frame mode) and when user adjustments require that the video image nonetheless be updated, causes the strobe generator to emit strobe pulses repetitively at the rate of thirty times a second. In this manner, new video image data is stored in frame memory 16, and the effects of user adjustments then being made (for example, gamma adjustments, focusing and image panning and zooming as discussed below) can be thereby instantaneously viewed by the user, despite the fact that the film frame being viewed has not itself been changed.

The fixed, predetermined width of the pulse generated by strobe generator 30 (which establishes the period of time during which the illuminated image of a given film frame is projected) is sufficiently short to minimize any blurring of the image captured by camera 36, which otherwise would occur at the higher speeds of motion of film 14 that film transport mechanism 19 provides. Nonetheless, the strobe pulse width is sufficiently long so that the total quantity of light projected onto the camera lens, when considered together with the illuminating characteristics of the strobe light and the light sensitivity characteristics of the camera, is adequate. This determination may be made using conventional analysis techniques familiar to one of ordinary skill in the art.

Strobe light 32 is electrically coupled to strobe generator 30, and is adapted to illuminate, for the transitory duration established by the strobe generator, the single film frame of film 14 which is located at film gate 22, and thereby briefly project an image of that film frame onto camera 36. As mentioned previously, in alternative embodiments of the invention the strobe light is replaced by a shuttering mechanism adapted to illuminate the film frame from a constant light source for a similar transitory duration.

Camera 36 is optically coupled to strobe light 32 and film 14, and is adapted to receive and capture an illuminated image of the film frame positioned in film gate 22 and to generate a video signal which represents that image. In the preferred embodiment of the present invention, camera 36 is a standard CCD video camera which produces an NTSC standard video output signal, such as a Sony XC-77 CCD black and white video camera. Alternatively the camera may be any other conventional video camera familiar to those of ordinary skill in the art.

Amplifier 38 is electrically coupled to camera 36 and is adapted to amplify the video output signal produced by the video camera. The amplifier may be implemented by a standard operational amplifier, such as a VA2708 or equivalent.

Gamma adjustment circuit 40 is electrically coupled to amplifier 38 and is responsive to keyboard 42, and is adapted to provide the user with the ability to improve the quality of the video image captured by camera 36. In particular, gamma adjustment improves the visibility of detail in the dark areas of high-contrast images, by stretching the black region of the gray level (brightness) scale while correspondingly narrowing the white region. In a preferred embodiment, several gamma adjustment functions are preselected, and the user of the system is able to select which of these functions, if any, is to be applied to the video signal emitted by camera 36. The gamma adjustment functions are implemented with standard analog components in a manner familiar to one of ordinary skill in the art, and are selectable via an analog multiplexer, such as a 74HC4052, which the user controls via keyboard 42. As discussed above, when the user of the preferred embodiment changes the selection of gamma adjustment functions while the motion of film 19 is stopped (still frame mode), it is desirable to at least momentarily activate the 30× strobe override input signal to strobe generator 30 to update the video image stored in frame memory 16.

A description of the operation of the image projector 13 and the image pickup system 15 as illustrated in FIG. 3 follows. As film transport mechanism 19 advances or rewinds film 14 as directed by the system user, film motion sensor 24, as a result of being coupled to sense the rotation of sprocket 34, supplies quadrature pulse signals comprising sprocket motion information to pulse generator 26. As a result, the direction of film motion and the amount by which film 14 has moved are determined.

In response to the signals provided by film motion sensor 24, pulse generator 26 emits count pulses on the signal line which supplies the up-count signal to counter 28 while sprocket 34 rotates in the forward direction (e.g., counterclockwise). In one embodiment, 250 pulses are generated when film 14 advances by an amount equal to the film frame pitch. Correspondingly, pulse generator 26 emits pulses on the signal line which supplies the down-count signal to counter 28 while sprocket 34 rotates in the reverse direction (e.g., clockwise).

In order to simplify its implementation, in one embodiment of the present invention the circumference of sprocket 34 is of such a size that it makes n rotations to advance film 14 by one film frame. In this manner, sprocket 34 may be provided with two independent sets of indicia spaced equally around its circumference, where the corresponding indicia of the respective sets are slightly displaced from one another. Thus, film motion sensor 24 need only detect the passing of these indicia as sprocket 34 rotates to generate the quadrature pulses.

When counter 28 has counted, either as a result of up-count signal pulses, down-count signal pulses, or a combination of both (i.e., the difference), the appropriate number of pulses from pulse generator 26 (e.g., when it reaches the count of either positive or negative 250), it generates a signal which triggers strobe generator 30 to generate a strobe pulse which, in turn, energizes strobe light 32 to be illuminated for the appropriate transitory duration. Simultaneously, counter 28 is reset so that it may begin counting afresh in order to determine when the next film frame is precisely positioned for strobing. Thus, strobe light 32 flashes for successive film frames precisely when each frame is positioned at film gate 22. It is appreciated that an initial adjustment should be made to accurately position one film frame at the imaging station and thereby establish reference. This initial adjustment, known as framing, may be performed by the user upon the initial loading of film 14 into film transport mechanism 19, and again at any subsequent time, if desired. In particular, the count value of counter 28 may be used as an offset by which the framing reference is established, by implementing the counter as a cyclical counter of the appropriate number of pulses (e.g., 250), and by using the count value at the time of framing as the value at which strobe pulses are triggered.

In the operation of image pickup system 15, camera 36 picks up the image of the film frame positioned in film gate 22 and projected onto the camera lens when strobe light 32 is triggered as aforesaid. The camera then supplies output video data, in standard NTSC format, through amplifier 38 and gamma adjustment circuit 40. The user of the system may select one of several predetermined gamma adjustment functions, or no gamma adjustment at all, by the use of keyboard 42. While camera 36 is in the process of reading out the video image data, it supplies an inhibit signal to strobe generator 30, thereby inhibiting strobe pulses from being supplied to strobe light 32. This prevents the corruption of the video data in camera 36 when the motion speed of film 14 exceeds the frame rate at which the camera outputs video data (i.e., thirty frames per second).

FIG. 4 is a block diagram which provides a more detailed representation of video enhancement circuit 18 according to the preferred embodiment of the present invention. The illustration shows a track ball 48, a window generator 46, keyboard 42, frame memory 16, a look-up table generator 18a and a look-up table 18b.

Track ball 48 is a conventional user input device adapted to provide a convenient means for entering continuous two-dimensional numerical data. It is comprised of an approximately hand-sized round ball, raised slightly above a mounting platform, and supported to be easily rotated in an arbitrary direction by the user's hand. The track ball is a standard commercially available computer input peripheral device, which performs functions similar to those of the computer "mouse" and "joystick", and may be easily interfaced for application by one of ordinary skill in the art. Although the preferred embodiment of the present invention uses track ball 48 as the user-input medium, it will be apparent that an alternative medium, such as a "mouse", a "joystick" or a keyboard, may be used if desired.

Window generator 46 is responsive to track ball 48 and is adapted to produce a minimum gray level and a maximum gray level, thus defining a "window" of gray levels upon which a selectable video enhancement function is to be performed. In the preferred embodiment of the present invention, vertical movement about the "x—x" axis of track ball 48 adjusts the size of the window (i.e., the difference between the minimum gray level and the maximum gray level to open and close the window), whereas horizontal movement about the "y—y" axis of the track ball adjusts the center value of the window (i.e., the location of the window on the gray scale). Preferably, the function of window generator 46 is implemented by a suitable program executed on a general purpose processor (an 8031 CPU). However, it will be appreciated that the window generator may be implemented by other means, such as circuitry which converts the user-input data to the window data.

Look-up table generator 18a is illustrated as being functionally coupled to window generator 46 and keyboard 42, and is adapted to determine video signal data conversion functions which improve the usefulness of the video images to be viewed by modifying the images in various user-selectable ways so that important features of the image can be viewed more clearly. In the preferred embodiment of the present invention, the look-up table generator is readily implemented by software executed on a general purpose processor (an 8031 CPU). Based on the "window" supplied by window generator 46 and the specific enhancement technique selected by the user via keyboard 42, the look-up table generator determines the specific gray level conversion (enhancement) function to be performed.

After the conversion function is selected, look-up table generator 18a loads data representing that conversion into look-up table 18b, to be described below. With this approach, the look-up table may be loaded with a desired enhancement function, i.e., a function converting each possible video signal value (gray level) in the video data to some resultant video signal value. The discussion of FIG. 5 below sets out examples of those enhancement functions provided for in the preferred embodiment. The look-up table data to be loaded can be quite small, since the number of possible video signal values is usually limited. For example, in the preferred embodiment of the present invention there are only 256 possible digitized values, each representing one of 256 possible gray levels. Alternative embodiments may implement look-up table generator 18a by means other than software, such as circuitry which generates the conversion data and loads it into look-up table 18b. Such implementations will be apparent to those of ordinary skill in the art.

Look-up table 18b is coupled to look-up table generator 18a and frame memory 16, and is adapted to convert the video data read from the frame memory into enhanced data based on the conversion function data previously loaded by look-up table generator 18a. In the preferred embodiment, look-up table 18b is implemented as two independent memories. At any given time, only one of these memories is used to convert video data into enhanced data. Meanwhile the other memory is available to be loaded with new conversion data by look-up table generator 18a. In this manner, until the look-up table generator completes the loading of the other memory, the video data being read out from frame memory 16 is not corrupted by being converted by partially incomplete conversion function data. Look-up table 18b may be implemented with standard RAM devices (two CXK5814P memories), as in the preferred embodiment of the present invention, but may alternatively be implemented by other programmable or non-programmable circuitry comprised of other devices such as ROMs, PLAs, or other standard components familiar to those of ordinary skill in the art. Furthermore, there need not be any physical look-up table or equivalent hardware circuitry at all, as the entire data conversion process may be performed partially or entirely by software executed on either a conventional general purpose or special purpose processor. Such alternative embodiments will also be apparent to those of ordinary skill in the art. In addition, although the preferred embodiment modifies the video data as it is read from frame memory 16, other embodiments may convert the video data to enhanced data by modifying the data stored in the frame memory in-place, by modifying the data as it is written into another memory, or by still further alternative arrangements.

In operation of the apparatus illustrated in FIG. 4, the user selects one of several predetermined video enhancement modes via keyboard 42, for example, a window mode, and then uses track ball 48 to set the upper and lower limits of the window via window generator 46. Look-up table generator 18a then determines the conversion function (i.e., the resultant output video signal value for each possible input video signal value) and loads conversion data into look-up table 18b. When video data is subsequently read from frame memory 16, look-up table 18b converts that video data to video output data which has been enhanced by the enhancement mode selected by the user.

FIGS. 5A-5F graphically illustrate several examples of useful video enhancement functions provided for by the preferred embodiment of the present invention. One particularly useful form of video enhancement is to "stretch" a user-selected window of gray levels into the full range of black to white, while blanking (changing to black) all gray levels outside of that window. FIGS. 5A, 5B and 5C are graphical depictions which show the resultant effect of this enhancement technique on the input gray levels with three differently chosen windows. In these graphical representations, the input video data read from the frame memory is plotted on the "x" axis, while the resultant enhanced video output data is plotted on the "y" axis. In each case the gray levels below the window minimum and above the window maximum, if any, are blanked out, while the gray levels within the window are stretched from black at the window minimum to white at the window maximum. In this manner, when viewing a film frame in which those areas of interest are within a given window of gray levels (brightness), the distinctions between the various gray levels within that window can be exaggerated, and portions of the image which are brighter or darker than those of interest are eliminated from the displayed video image.

As shown in FIG. 5D, the black to white gray levels can be reversed by the use of a different enhancement function, thus creating a negative image for viewing. In addition, as shown in FIG. 5E, this polarity inversion enhancement technique can be combined with the aforementioned window stretching technique in such a manner as to create a "stretched" negative image within a given gray level window. It will be noted that in this case, since the enhanced image is polarity-inverted, the portions of the original image which are brighter or darker than those within the window are converted to white, not black levels.

In the preferred embodiment of the present invention, gamma adjustment typically is performed by gamma adjustment circuit 40 within image pickup system 15. Alternatively, gamma adjustment may be provided as a video enhancement function, as shown in FIG. 5F. In particular, by using the window generation capability of window generator 46, a "stretched" gamma function enhancement may be performed on only that portion of the image which is of interest, i.e., only within a specified gray level window. Gray levels outside of the selected window are blanked. Other enhancement functions may be provided with embodiments of the present invention.

FIG. 6 is a block diagram of a preferred embodiment which is implemented as a digital video system under the control of a digital signal processor 52. The apparatus includes an analog to digital converter 50, frame memory 16, video enhancement circuit 18, video output circuit 20, and digital signal processor 52.

Analog to digital converter 50 is coupled to image pickup system 15 and is adapted to convert the analog video signals generated by the image pickup system to digital signals. In the preferred embodiment of the present invention, the image pickup system generates pixel data and each pixel is converted to an 8-bit digital signal, thereby providing for the representation of 256 different gray levels (i.e., levels of brightness). The analog to digital converter is implemented by a standard device (such as a CXA1096P), but may be replaced by other embodiments of analog to digital conversion circuitry familiar to one of ordinary skill in the art.

Frame memory 16 is coupled to analog to digital converter 50 and to digital signal processor 52, and is adapted to store the digitized pixels which represent the video image of a single film frame.

Video enhancement circuit 18 is coupled to frame memory 16 and to digital signal processor 52, and is adapted to enhance the digitized pixels based on the specific enhancement function selected, as described above.

Digital signal processor 52 is coupled to image projector 13, image pickup system 15, digital frame memory 16 and video enhancement circuit 18, and is adapted to control the operation of the digital video system. As is known, a digital signal processor (DSP) is a special purpose programmable processor designed for applications involving the manipulation of digital signals. The DSP used to implement digital signal processor 52 in the preferred embodiment of the present invention is a Texas Instruments 320C25, but may alternatively be any other digital signal processor heretofore or hereinafter devised and familiar to those of ordinary skill in the art. In other embodiments, any conventional general purpose or special purpose programmable processor or combination of processors may be substituted for digital signal processor 52.

As was described above, video output circuit 20 is coupled to video enhancement circuit 18, and is adapted to produce one or more video output signals including, in particular, a digital video output signal in "D-2" standard format which may be used for recording by a digital VCR such as the Sony DVR-10 or may be used directly by other digital video products adhering to the D-2 standard.

In operation, the output of image pick-up system 15 is converted to digital video signals by analog to digital converter 50, and the resultant digital signal data for a given film frame is stored in frame memory 16. When subsequently read from the frame memory, this digital video data is processed by video enhancement circuit 18 which produces enhanced digital video data in the manner discussed above. Video output circuit 20 then formats this enhanced data to produce one or more video output signals, and may also reconvert the digital video data back to an analog video format, thereby providing one or more analog video output signals as well.

In the preferred embodiment of the present invention, the operation of the digital video system shown in FIG. 6 is controlled by digital signal processor 52 which may control some or all of the various functions performed by the system and described herein. For example, the selection of the gamma adjustment function to be applied by gamma adjustment circuit 40 of image pickup system 15 may be controlled by the processor in response to the user's requests via keyboard 42. The loading and reading out of the digital video data in frame memory 16 is controlled by the processor 52. The operation of video enhancement circuit 18 may also be controlled by the processor in response to the user's requests via keyboard 42 and the windowing data supplied by window generator 46 in response to the user's input via track ball 48. In particular, the processor may be used to implement look-up table generator 18a as described above, and/or the process of loading look-up table 18b with the conversion data as also described above may be controlled by processor 52. The processor may also control both the inhibit signal input and the 30× strobe override signal input to strobe generator 30 of image projector 13. It is recalled that the inhibit signal is produced in response to "camera-not-ready" data which may be supplied by camera 36 of image pickup system 15, and the 30× strobe override signal is produced when, for example, the user effects adjustments during a still frame mode. In addition, processor 52 may control various other functions performed by the system in a manner which will be readily apparent to one of ordinary skill in the art. For example, the processor may control the setting of the focus adjustment of camera 36, as well as the setting of the camera iris (i.e., the diameter of the lens opening which thereby determines the quantity of light which enters the lens), each in response to user requests, entered, for example, via keyboard 42.

Figure 7:
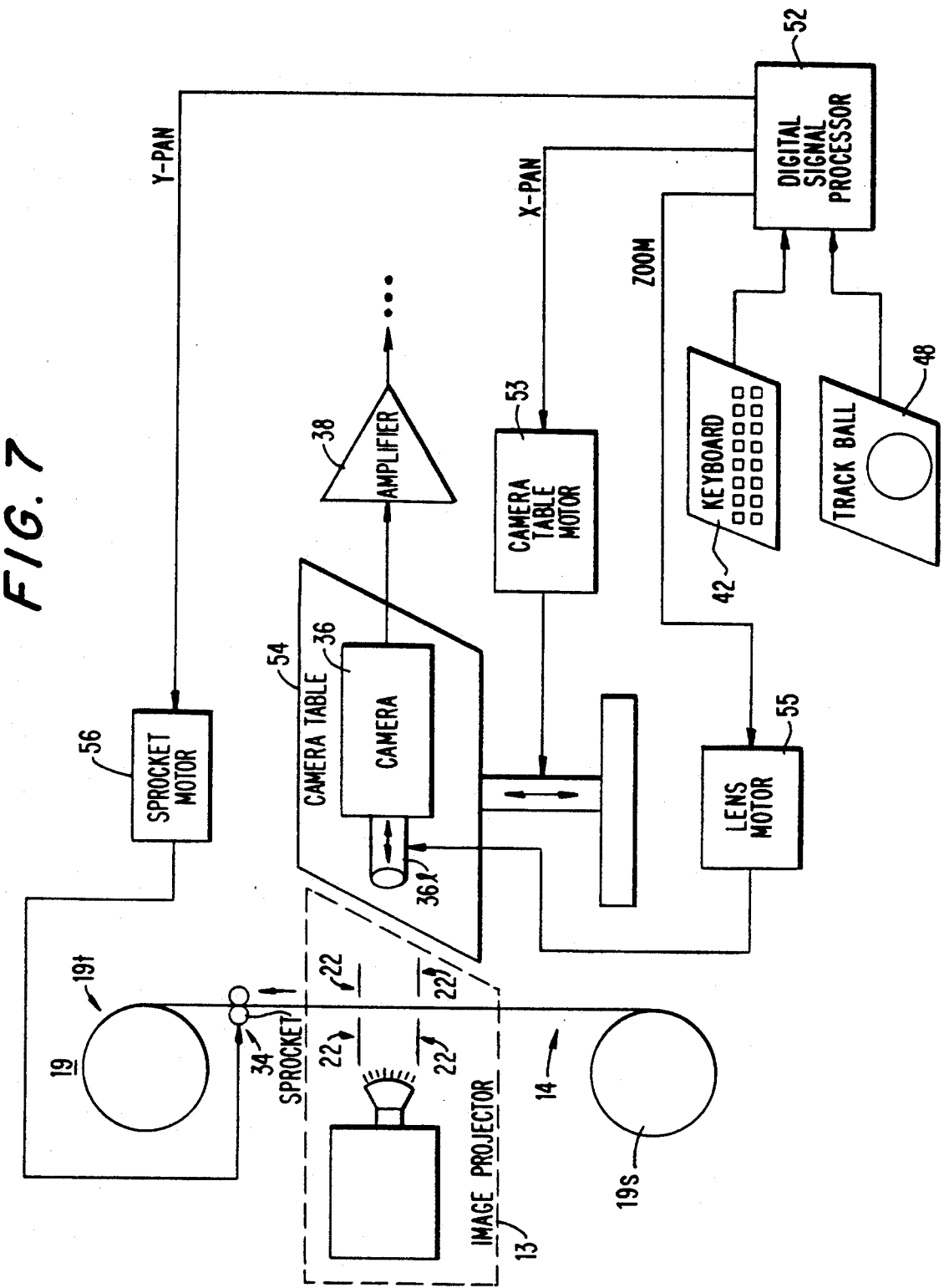
FIG. 7 is a block diagram which illustrates the feature of the present invention wherein "zooming" and "panning" of the displayed image are provided.

FIG. 7 is a block diagram which illustrates the feature of the present invention wherein "zooming" and "panning" of the displayed image are provided. That is, a portion of the film frame which is displayed to the user on a video monitor may be magnified by the use of an image zoom mechanism, and that portion of the magnified image which is displayed may also be moved up, down, left or right (i.e., image pan). This image zoom and pan subsystem is comprised of digital signal processor 52, a lens motor 55, camera 36 containing a camera zoom lens 361, a camera table motor 53, a camera table 54, a sprocket motor 56, and sprocket 34.

Digital signal processor 52 is coupled to keyboard 42, track ball 48, lens motor 55, camera table motor 53 and sprocket motor 56, and in the context of the image zoom and pan subsystem is adapted to control the operation of the lens motor, camera table motor and sprocket motor in response to user requests supplied through the keyboard and track ball.

Lens motor 55 is coupled to digital signal processor 52 and is adapted to control the magnification setting of camera zoom lens 361 in response to the input signals it receives. In the preferred embodiment of the present invention, the lens motor is integral to the Sony XC-77 video camera used to implement camera 36, but alternatively, either a different video camera with an integral zoom lens motor may be used, or lens motor 55 may be an independent servomotor familiar to those of ordinary skill in the art, which is mechanically coupled to camera zoom lens 361.

Camera 36 which is optically coupled to film 14 and image projector 13, is physically coupled to camera table 54. The camera includes camera zoom lens 361 which is coupled to lens motor 55 and is adapted to increase and decrease, within defined limits, the magnification of the film frame image projected onto the lens by the image projector. Thus, as the magnification of the image is increased, a smaller portion of the film frame positioned at film gate 22 is captured by the camera and thereby becomes the video image, and as the magnification is decreased, a larger portion of the film frame is captured as the video image.

Camera table motor 53 is coupled to digital signal processor 52 and is adapted to control the movement and thereby the "x—x" position of camera table 54 relative to film 14 in response to the input signals it receives. In the preferred embodiment, the camera table motor is comprised of a Yaskawa Electric FB5-20E type DC servomotor, but may alternatively be implemented with any other comparable servomotor familiar to those of ordinary skill in the art.

Camera table 54 is mechanically coupled to camera table motor 53 and supports camera 36. The camera table is adapted to shift or reposition the camera mounted thereon which, because of the arrangement of the film frames recorded "sideways" on the film, pans the video image along the "x—x" axis (i.e., "X-pan"). More specifically, as camera 36 is shifted in a direction perpendicular to the axis of motion of film 14, that portion of the film frame positioned at film gate 22 whose illuminated image is captured by the camera is correspondingly shifted, thereby resulting in motion to the left or to the right in the video image.

Sprocket motor 56 is coupled to digital signal processor 52 and is adapted to control the rotation of sprocket 34 and thereby the motion and position of film 14. In the context of the image zoom and pan subsystem, the sprocket motor is particularly adapted to produce small rotation adjustments of the sprocket, specifically within limits corresponding to the length of a single film frame as recorded on film 14. In this manner, the film is subjected to small adjustments along the "y—y" axis of the video image and the precise relative location between each frame of film 14 and film gate 22 is shifted by a corresponding amount in the corresponding direction. In the preferred embodiment of the present invention, the sprocket motor is implemented with a Yaskawa Electric FB5-20E type DC servomotor, but may alternatively be implemented by other servomotors familiar to those of ordinary skill in the art.

Sprocket 34 is mechanically coupled to sprocket motor 56 and physically coupled to the sprocket holes of film 14, and is adapted to control the motion and position of film 14. Fine adjustments of the rotational position of sprocket 34 by sprocket motor 56 pan the video image along the "y—y" axis (i.e., "Y-pan"). More specifically, as sprocket 34 is rotated slightly in either direction, film 14 advances or rewinds slightly, and, therefore, that portion of the film frame positioned at film gate 22 whose illuminated image is captured by camera 36 is shifted in a corresponding direction and by a corresponding amount. Since the film frames are recorded "sideways" on the film, this slight movement results in upward or downward motion in the video image. In the preferred embodiment of the present invention, a given setting of the film panning position may be stored for future retrieval. In particular, the X-pan position is stored by recording the position of camera table 54, while the Y-pan position is stored by recording the value of counter 28 of image projector 13 (which represents the position of sprocket 34), thereby providing an alternative framing reference as described in the discussion of FIG. 3 above.

In operation of the image zoom and pan subsystem in the preferred embodiment of the present invention, the user presses either the zoom key or the pan key on keyboard 42. In response, digital signal processor 52 causes the system to enter the zoom mode or the pan mode respectively, in either case activating track ball 48 for further user input. In the zoom mode, the user then adjusts the track ball either by moving it up to increase the magnification provided by zoom lens 361, or down to decrease the magnification. Digital signal processor 52 responds to the track ball input to drive lens motor 55 to adjust the zoom lens accordingly. In the pan mode, the user adjusts track ball 48 in any of its possible directions (vertically, horizontally, or a combination of vertical and horizontal movement). In response, digital signal processor 52 first separates the horizontal component of the track ball motion from the vertical component. It then drives camera table motor 53 to adjust the position of camera table 54, and thereby the position of camera 36 relative to film 14, in accordance with the horizontal component of the track ball motion (X-pan). The processor also drives sprocket motor 56 to adjust the rotational position of sprocket 34, and thereby the relative position of each film frame of film 14 with respect to film gate 22, in accordance with the vertical component of the track ball motion (Y-pan).

In this manner, within the limitations of the magnification power (i.e., the maximum zoom capability) of camera zoom lens 361, the user may select that portion of the film frame that he or she wishes to view, and magnify it so that it fills the viewing screen. It is to be appreciated that, since the resolution of the image on film 14 typically is higher than the resolution of camera 36 or the video monitor on which the image is viewed, the resolution of that portion of the image or images which have been optically magnified will be proportionally increased, thereby allowing the user to see additional detail in the magnified image.

As discussed above, when the user of the preferred embodiment of the present invention is modifying the zoom and pan settings while the motion of film 14 is stopped (still frame mode), it is advantageous to activate the 30× strobe override input signal to strobe generator 30 of image projector 13. As a result, the system updates the video image stored in frame memory 16 with each strobe pulse, and thus, the user is able to view immediately the effects of the zoom and/or pan setting adjustments being made. It is to be appreciated that even though zoom and pan adjustments preferably are made while the motion of film 14 is stopped (still frame mode), film motion may be resumed while maintaining the same user-selected zoom and pan settings. In the preferred embodiment specific zoom and pan settings may be stored and thereafter restored after further modifications to these settings, simply by pressing a reset key on keyboard 42.

Figure 8:
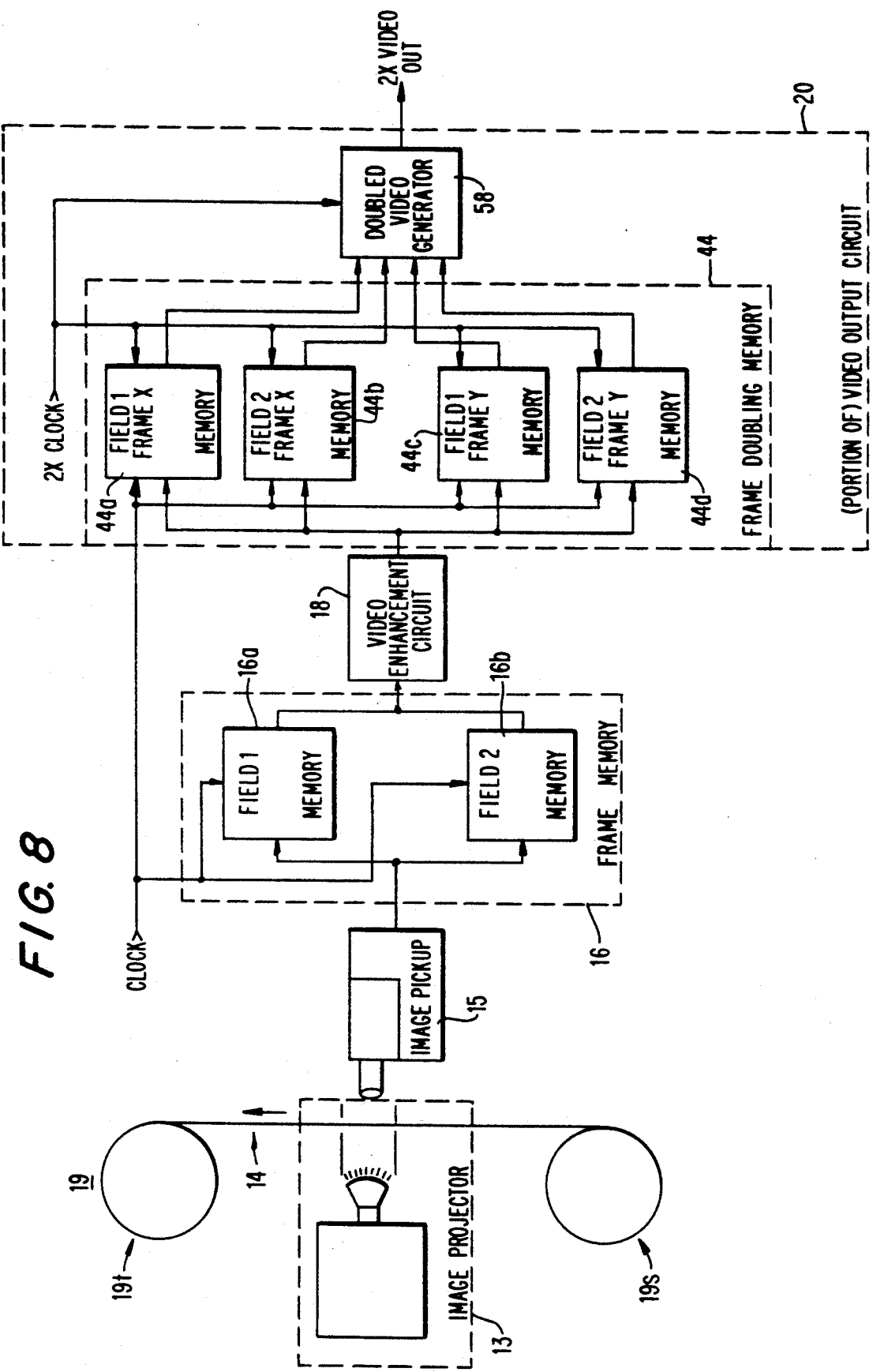
FIG. 8 is a block diagram which details the generation of the "Hi-line" composite video output circuit.

FIG. 8 is a block diagram which details the generation of the "Hi-line" composite video output signal by video output circuit 20. The illustration shows frame memory 16 as being comprised of a field 1 memory 16a and a field 2 memory 16b; and a portion of video output circuit 20 as being comprised of frame doubling memory 44 and doubled video generator 58. Frame doubling memory 44 is, in turn, comprised of a field 1 frame X memory 44a, a field 2 frame X memory 44b, a field 1 frame Y memory 44c, and a field 2 frame Y memory 44d.

Frame memory 16 is adapted to store a single frame of video data supplied by image pickup system 15 in two separate "interleaved" fields, field 1 and field 2, as is conventional. Preferably, field 1 memory 16a is specifically adapted to store the first field of the video data supplied by image pickup system 15, and field 2 memory 16b is specifically adapted to store the second field of the supplied video data. In the preferred embodiment, field 1 memory 16a and field 2 memory 16b are each implemented with standard video field memories (for example, two CXK1206M devices each), but other storage devices familiar to those of ordinary skill in the art may alternatively be used.

Frame doubling memory 44 is coupled to video enhancement circuit 18 and is adapted to store video image data for each of the two fields of two successive film frames. The data stored in the frame doubling memory is read out at twice the rate that the data is written therein. Frame doubling memory 44 is comprised of field 1 frame X memory 44a, which is adapted to store the first field of the video data for one of the two aforementioned successive film frames, field 2 frame X memory 44b, which is adapted to store the second field of the video data for the same one of the two successive film frames, field 1 frame Y memory 44c, which is adapted to store the first field of the video data for the other of the two aforementioned successive film frames, and field 2 frame Y memory 44d, which is adapted to store the second field of the video data for that other film frame.

It will be appreciated that in the preferred embodiment of the present invention, neither the frame X doubling memories (field 1 frame X memory 44a and field 2 frame X memory 44b) nor the frame Y doubling memories (field 1 frame Y memory 44c and field 2 frame Y memory 44d) always contain the earlier of the two successive film frames, but, rather, their roles in this regard alternate. In particular, in order to provide for increased efficiency of operation, if the video data of the first of two successive film frames is stored in frame X memories 44a and 44b, and the video data of the second film frame is stored in frame Y memories 44c and 44d, for example, then when a new (third) film frame is imaged and captured, it is stored in frame X memories 44a and 44b, so that the frame Y memories now contain the earlier of the two successive film frames. It will also be seen that the aforementioned film frames are successive to the extent that the video image data which represents them are successively stored in frame memory 16; but they need not necessarily be successive film frame images as recorded on film 14. In particular, there may be numerous other film frame images recorded between them on the film (as might occur during high speed film motion), or, they may in fact be the same film frame as recorded on the film (as would be the case in still frame mode).

In order to provide the video data for the Hi-line video output signal at twice the standard line rate, frame doubling memory 44 is implemented with memory devices capable of reading out the data stored therein at twice the rate that the data is written therein. Thus, it is preferable that these devices include independent clock inputs for reading and writing data. In the preferred embodiment of the present invention, the frame doubling memories are implemented by standard video field memories (a total of eight 4C1050 devices), but other storage devices which may be independently written to and read from, which are familiar to those of ordinary skill in the art, may alternatively be used.

Doubled video generator 58 is coupled to frame doubling memory 44, and is adapted to generate a Hi-line video output signal at twice the standard line rate (1050 scan lines each 1/30th of a second) by selectively combining the video signal data included in separate video fields stored in the frame doubling memory, thereby improving the quality of the generated video image. In a first embodiment of the present invention, doubled video generator 58 produces, for each film frame, a video image of the frame comprising all 525 lines, which is output twice in succession for (non-interleaved) display on a multi-scan monitor. As a result of the fact that the entire image is displayed twice in the same amount of time normally used to display a video image once 1/30th of a second), the resultant image is brighter, the noticeability of raster scan lines is reduced, and there is a significant increase in the apparent resolution. It is to be appreciated, however, that as a result of frame doubling memory 44 and the doubled output speed, the Hi-line video output signal generated is delayed by one frame (i.e., 1/30th of a second) as compared to the standard video output signal.

In a second embodiment, doubled video generator 58 produces, for each film frame, two output fields in sequence, which, when interleaved according to the NTSC standard and displayed on a high resolution monitor, constitute an entire image comprised of 1050 lines. Each of these output fields is formed of twice the number of lines (525) contained in each input field of the individual film frames (which is formed of 262.5 lines). In this second embodiment, the first output field which is generated by doubled video generator 58 is comprised of alternating lines selected from the two input fields of a given film frame. That is, if frame X memories 44a and 44b contain the video data for the given film frame, the first of the two output fields generated by doubled video generator 58 is comprised of alternating lines of video data selected from field 1 frame X memory 44a and field 2 frame X memory 44b, respectively, thus producing an output field of 525 lines. Correspondingly, if frame Y memories 44c and 44d contain the video data for the given film frame, the first of the two output fields is comprised of alternating lines of video data selected from field 1 frame Y memory 44c and field 2 frame Y memory 44d, respectively.

In this second embodiment of the present invention, the second of the two output fields generated by doubled video generator 58 is produced by mixing certain lines from the subsequent film frame with certain lines from the given film frame. More specifically, field 1 of the subsequent film frame is alternated with field 2 of the given film frame. That is, if frame X memories 44a and 44b contain the video data for the given film frame, and frame Y memories 44c and 44d contain the video data for the subsequent film frame, the second of the two output fields generated by doubled video generator 58 is comprised of lines of video data selected from field 1 frame Y memory 44c alternating with lines of video data selected from field 2 frame X memory 44b, respectively. Correspondingly, if frame Y memories 44c and 44d contain the video data for the given film frame, and frame X memories 44a and 44b contain the video data for the subsequent film frame, the second of the two output fields generated by doubled video generator 58 is comprised of lines of video data selected from field 1 frame X memory 44a alternating with lines of video data selected from field 2 frame Y memory 44d, respectively.

In this manner, doubled video generator 58 in the second embodiment produces a Hi-line output video signal which not only provides for a video image comprising twice the standard number of lines, but improves the overall quality of video images which are in motion by allowing video signals derived from one frame to slightly permeate the display of the video signals derived from the previous frame. In particular, one out of four of the lines of each film frame viewed will in fact be selected from the corresponding portion of the next film frame to be viewed.

In yet another (third) embodiment, the second output field is produced by combining the lines of both fields (i.e., fields 1 and 2) of the subsequent film frame, rather than using the lines of field 1 of the subsequent film frame with the lines of field 2 of the given film frame. This alternative equally mixes the video data from the subsequent film frame with the video data from the previous one, but has the disadvantage that yet an additional delay of one frame must be incurred, and, moreover, 12 additional frame doubling memory is required, in order to ensure that all of the field 2 video data of the subsequent frame has been stored in frame doubling memory 44 before doubled video I5 generator 58 reads that data out.

· Doubled video generator 58 is implemented in the preferred embodiment as a portion of a Xilinx XC3020 programmable ASIC (application specific integrated circuit), but may alternatively be implemented by other circuitry and/or software executed on a conventional general purpose or special purpose processor, familiar to those of ordinary skill in the art.

Figure 9:
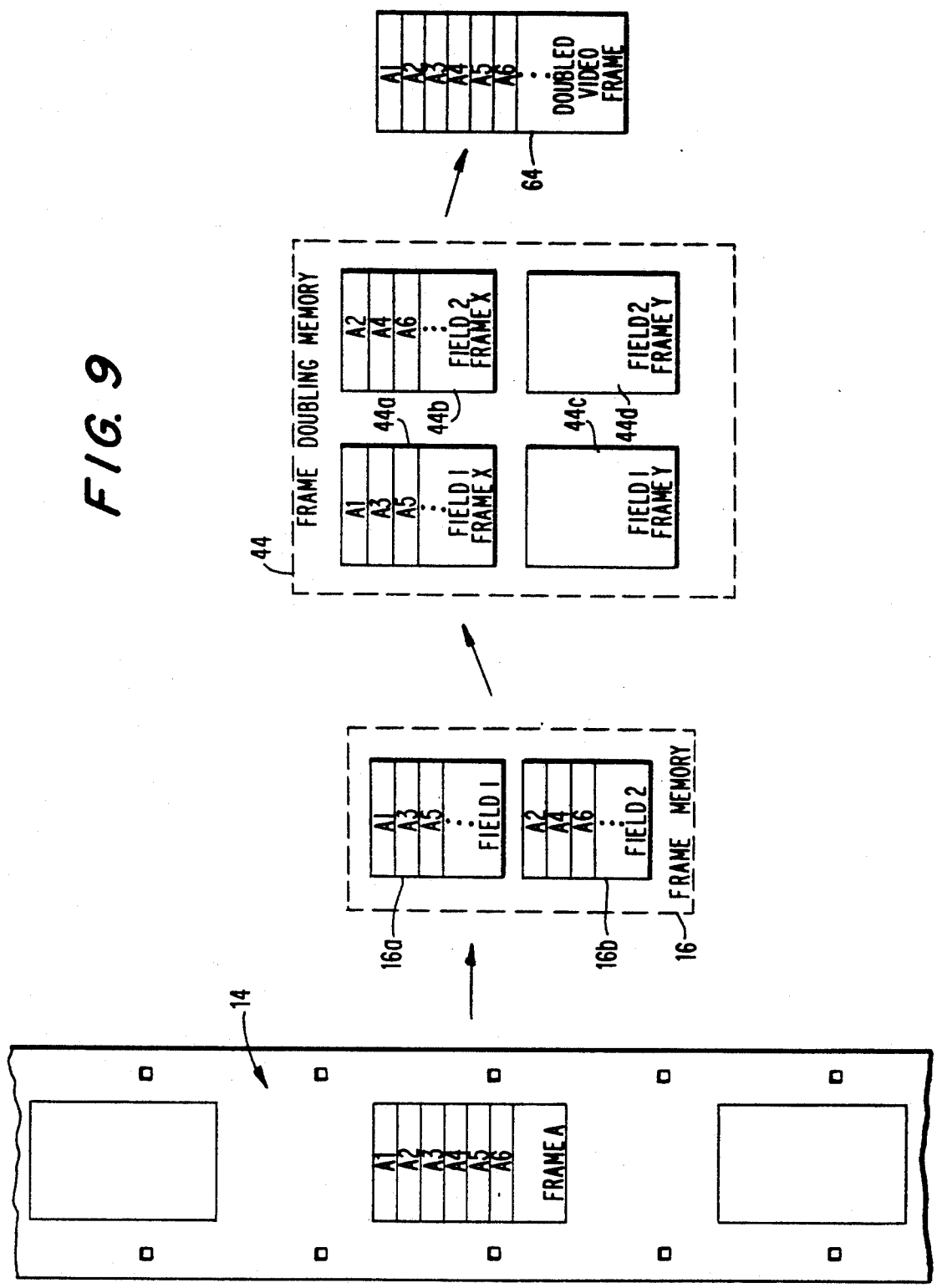
FIG. 9 schematically shows the generation of Hi-line video output images according to one embodiment.

The operation of the Hi-line generator illustrated in FIG. 8 according to the aforementioned first embodiment is best appreciated by reference to FIG. 9, which schematically shows the generation of a Hi-line video output image according to this embodiment. As the video image data for a given film frame of film 14 is read out of camera 36 of image pickup system 15 and stored in frame memory 16, the horizontal scan lines of video data which make up the image are separated into two fields, each representing alternating lines of the video image, as defined by the NTSC standard. Thus, when the video data representing film frame A, containing horizontal scan lines A1, A2, A3, A4, A5, A6, . . . , is stored in frame memory 16, the data for lines A1, A3, A5, is stored in field 1 memory 16a, and the data for lines A2, A4, A6, . . . is stored in field 2 memory 16b. When the video data for film frame A is subsequently read out from frame memory 16, each of the two fields of data is stored separately in frame doubling memory 44, either in frame X memory 44a and 44b, or in frame Y memory 44c and 44d, depending on where the data last read out was stored. In particular, if the video data from the immediately preceding frame read out from frame memory 16 had been stored in the frame X doubling memory, then the data from field 1 memory 16a is written in field 1 frame Y memory 44c, and the data from field 2 memory 16b written in field 2 frame Y memory 44d. If, on the other hand, as is assumed in the illustration, the video data from the immediately preceding frame read out from frame memory 16 had been stored in the frame Y doubling memory, then the data from field 1 memory 16a is written in field 1 frame X memory 44a, and the data from field 2 memory 16b is written in field 2 frame X memory 44b.

Next, as the video data for the subsequent film frame is being read out from frame memory 16 and stored in frame doubling memory 44, doubled video generator 58 generates doubled video frame 64 by alternately reading out the contents of field 1 frame X memory 44a and field 2 frame X memory 44b, where the data for the given film frame, frame A, was stored. As a result, doubled video frame 64 is comprised of horizontal lines A1, A2, A3, A4, A5, A6, . . . , twice the normal number of lines in a field, and the same as the total number of lines in a complete frame. Since frame doubling memory 44 is read out at twice the rate that data is stored therein, only field 1 of the video data for the subsequent film frame has been stored (in field 1 frame Y memory 44c) when doubled video generator 58 has completed the generation of doubled video frame 64. Therefore, while field 2 of the video data for the subsequent film frame is being stored in field 2 frame Y memory 44d, doubled video generator 58 generates doubled video frame 64 again. In this manner, lines A1, A2, A3, A4, A5, A6, . . . , which comprise all the lines of the video image of film frame A, are displayed twice in succession by the (non-interlaced) interlaced) multi-scan monitor, both of which occur within the time normally used to display all the lines of an image once (1/30th of a second).

It will be seen that doubled video frame 64 need not be stored in a memory. That is, doubled video generator 58 produces the Hi-line video output signal directly by reading the video data out of frame doubling memory 44 in the sequence described, and, in order to produce a resultant analog video signal, supplies the digital video data through a digital to analog converter, to which composite synchronizing and blanking signals are added.

Figure 10:
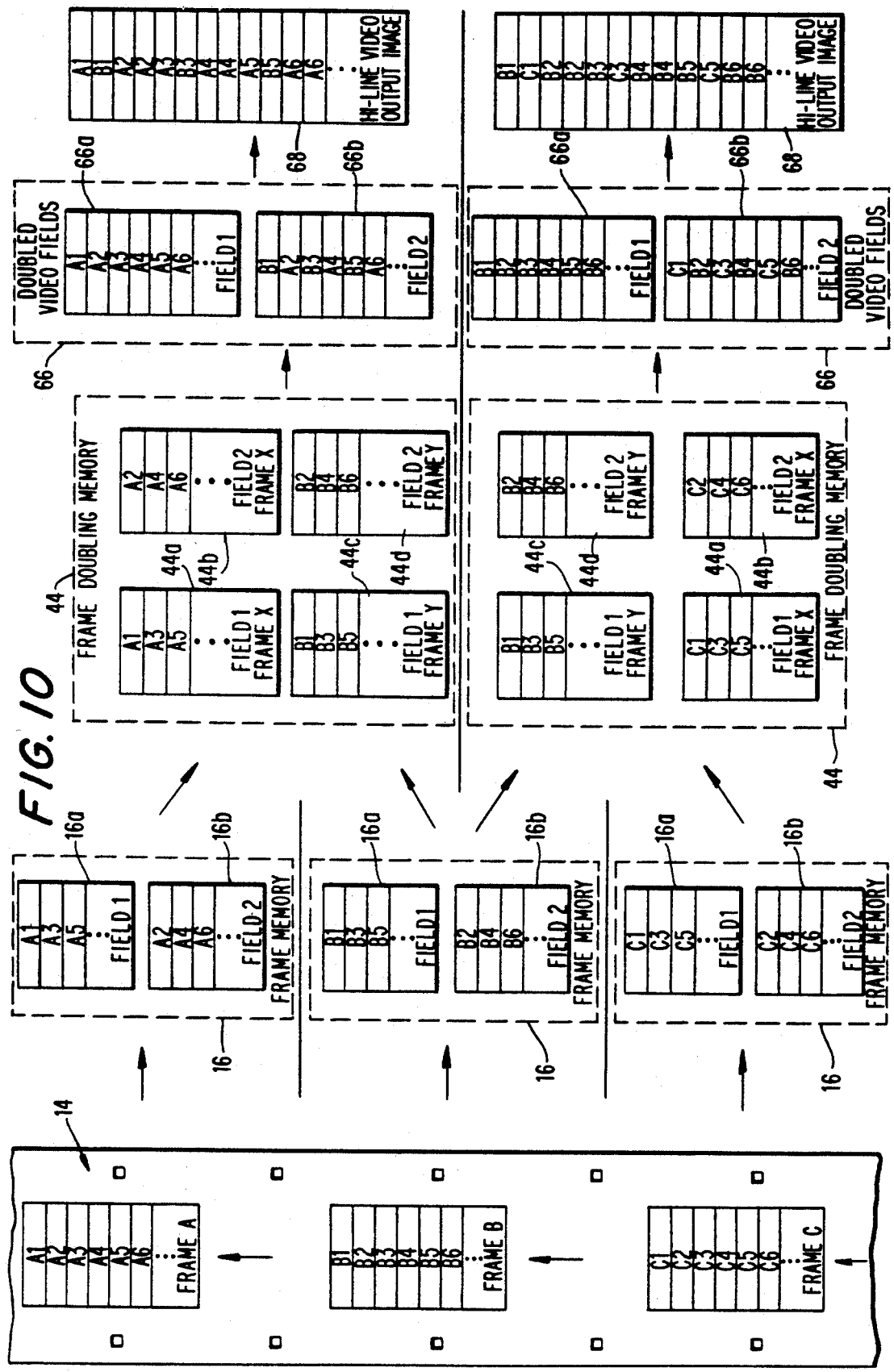
FIG. 10 schematically shows the generation of Hi-line video output images according to a second embodiment.

An alternative operation of the Hi-line generator illustrated in FIG. 8, according to the second embodiment, is best appreciated by reference to FIG. 10, which schematically shows the generation of two successive Hi-line video output images, based on three successive film frames, A, B and C of film 14. Although, as pointed out above, the successive film frames s used to create the Hi-line images need not be successive as recorded on film 14, they are illustrated as such for the sake of simplicity. It will be recognized that the bold horizontal lines in the illustration serve to separate portions of the diagram which represent the same physical or conceptual entity at different points in time.

As the video image data for each film frame of film 14 is read out of camera 36 of image pickup system 15 and stored in frame memory 16, the horizontal scan lines of video data which make up the image are separated into two fields, each representing alternating lines of the video image, as defined by the NTSC standard, and as described above. Thus, when the video data representing film frame A, containing horizontal scan lines A1, A2, A3, A4, A5, A6, . . . , is stored in frame memory 16, the data for lines A1, A3, A5, . . . is stored in field 1 memory 16a, , and the data for lines A2, A4, A6, . . . is stored in field 2 memory 16b. When the video data for film frame A is subsequently read out from frame memory 16, each of the two fields of data is stored separately in frame doubling memory 44, either in frame X memory 44a and 44b, or in frame Y memory 44c and 44d, depending on where the data last read out was stored. In particular, if the video data from the immediately preceding frame read out from frame memory 16 had been stored in the frame X doubling memory, then the data from field 1 memory 16a is written in field 1 frame Y memory 44c, and the data from field 2 memory 16b is written in field 2 frame Y memory 44d. If, on the other hand, as is assumed in the illustration, the video data from the immediately preceding frame read out from frame memory 16 had been stored in the frame Y doubling memory, then the data from field 1 memory 16a is written in field 1 frame X memory 44a, and the data from field 2 memory 16b is written in field 2 frame X memory 44b.

Next, when the video data representing film frame B, containing horizontal scan lines B1, B2, B3, B4, B5, B6, . . . , is stored in frame memory 16, the data for lines B1, B3, B5, . . . is stored in field 1 memory 16a, and the data for lines B2, B4, B6, is stored in field 2 memory 16b. When the video data for film frame B is subsequently read out from frame memory 16, each of the two fields is again stored separately in frame doubling memory 44, in this case in frame Y memory 44c and 44d, since the video data for film frame A was last stored in the frame X doubling memory. That is, the data from field 1 memory 16a is written in field 1 frame Y memory 44c, and the data from field 2 memory 16b is written in field 2 frame Y memory 44d.

As the video data for film frame B is being stored in frame doubling memory 44, doubled video generator 58 generates Hi-line video output image 68 (i.e., the first of the two illustrated in FIG. 10). In particular, the doubled video generator first generates doubled video field 1 66a by alternately reading out the contents of field 1 frame X memory 44a and field 2 frame X memory 44b, thereby creating the first output field 66a which ultimately constitutes half of interlaced Hi-line video output image 68. It is recognized that since the video data for the current film frame, frame B, is being stored in frame Y memories 44c and 44d, the doubled video generator generates its first output field 66a from frame X memories 44a and 44b, where the data for the previous film frame, frame A, was stored. As a result, doubled video field 1 66a is comprised of horizontal lines A1, A2, A3, A4, A5, A6, . . . , twice the normal number of lines in a field, and the same as the total number of lines in a normal complete frame.

Since frame doubling memory 44 is read out at twice the rate that data is stored therein, only field 1 of the video data for film frame B has been stored (in field 1 frame Y memory 44c) when doubled video generator 58 has completed the generation of doubled video field 1 66a. Therefore, while field 2 of the video data for film frame B is being stored in field 2 frame Y memory 44d, doubled video generator 58 generates the second field 66b of the two doubled video fields. To avoid timing problems, field 2 of the video data for film frame B is not used in the generation of this Hi-line video output image in the aforementioned second embodiment. Thus, doubled video generator 58 generates doubled video field 2 66b by alternately reading out the contents of field 1 frame Y memory 44c, which contains the video data for field 1 of film frame B, and field 2 frame X memory 44b, which still contains the video data for field 2 of film frame A. As a result, doubled video field 2 66b is comprised of horizontal lines B1, A2, B3, A4, B5, A6, . . . , also twice the normal number of lines in a field. Therefore, when the two doubled video fields 66a and 66b are combined, they contain twice the total number of lines in a normal complete frame.

Since doubled video field 1 66a and doubled video field 2 66b are generated by doubled video generator 58 in succession, the resulting display on a high resolution interlaced monitor, according to the NTSC standard, is the video image which results from interleaving the horizontal lines of these two doubled fields. That is, Hi-line video output image 68 appears on the monitor as comprised of the horizontal lines A1, B1, A2, A2, A3, B3, A4, A4, A5, B5, A6, A6, . . . , thus creating an effective double-line image of film frame A with every other line of film frame B permeating into every fourth line, and thereby improving the overall quality of the video images when in motion.

It will be seen that neither doubled video fields 66 nor Hi-line video output image 68 need be stored in a memory. That is, in the aforementioned second embodiment, doubled video generator 58 produces the Hi-line video output signal directly by reading the video data out of frame doubling memory 44 in the sequence described, and, in order to produce a resultant analog video signal, supplies the digital video data through a digital to analog converter, to which composite synchronizing and blanking signals are added.

The lower half of FIG. 10 shows the generation of a second Hi-line video output image 68, which is based on the video data derived from film frame B and film frame C. Since the process is identical to that described in detail above, however, it need not be repeated. The purpose of this portion of the illustration is merely to show the switching of the roles of the frame X doubling memories and the frame Y doubling memories, which occurs in the generation of alternate Hi-line video output images. Although the preceding discussion describes in detail the implementation of the line-doubled video signal generation technique of the present invention according to two specific embodiments, numerous other approaches to the generation of such video signals will be obvious to those of ordinary skill in the art.

Figure 11:
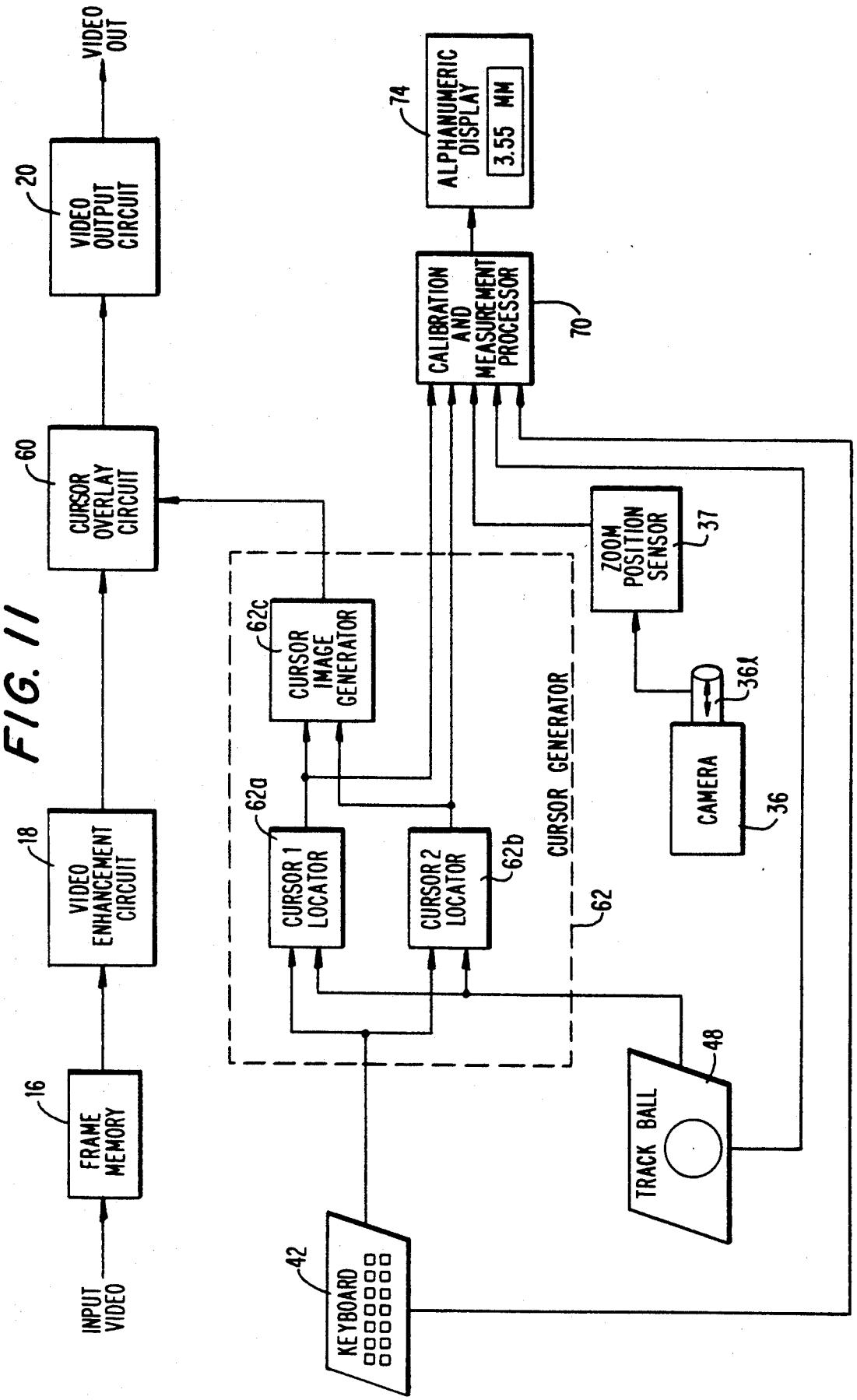
FIG. 11 is a block diagram depicting the operation of the present invention whereby one or more cursors may be overlaid, or superimposed, on the video image, and of the calibration and measurement functions whereby relative or actual physical distances between two such cursors may be determined.

FIG. 11 is a block diagram depicting the operation of the present invention whereby one or more cursors may be overlaid, or superimposed, on the video image, and relative or actual physical distances between two such cursors may be determined. The preferred embodiment as depicted provides for two independent cursors, and as a result, is comprised of a cursor generator 62 which includes a cursor 1 locator 62a, a cursor 2 locator 62b, and a cursor image generator 62c, a cursor overlay circuit 60, a calibration and measurement processor 70, a zoom position sensor 37, and an alphanumeric display 74.

Cursor 1 locator 62a is responsive to keyboard 42 and track ball 48, and is adapted to select a first cursor to be overlaid on the display of the video image of the film frame being viewed and to locate that cursor at a user-selectable location on the video image. In the preferred embodiment, the user activates cursor 1 positioning mode by pressing a corresponding cursor 1 key on keyboard 42, whereupon cursor 1 locator 62a is enabled to accept signals from track ball 48 in order to determine the location on the video image whereat cursor 1 is positioned. In particular, the location of cursor 1 is continually repositioned by cursor 1 locator 62a (and thereby continually displayed on the video image as a result of cursor image generator 62c and cursor overlay circuit 60, as described below) and, therefore, the cursor moves about on the video image as the user continues to operate track ball 48. When the user ceases to move the track ball, cursor 1 is "locked" in place at its current location, and the cursor 1 positioning mode is deactivated. In the preferred embodiment, cursor 1 locator 62a is implemented with software executed on the Texas Instruments 320C25 digital signal processor, but alternatively may be implemented with software executed on other special purpose or conventional general purpose processors, or by discrete circuitry known to those of ordinary skill in the art.

Cursor 2 locator 62b is responsive to keyboard 42 and track ball 48, and is adapted to select a second cursor to be overlaid on the display of the video image of the film frame being viewed and to locate that cursor at a user-selectable location on the video image. The operation and implementation of cursor 2 locator 62b and the cursor 2 positioning mode is identical to that of cursor 1 locator 62a and cursor 1 positioning mode, and, therefore, it is unnecessary to describe the operation in detail again.

Cursor image generator 62c is coupled to cursor 1 locator 62a and cursor 2 locator 62b, and is adapted to generate cursor image location data which represents the pixel locations of the video image which are to be overlaid by the display of the cursor image or images. The output of cursor image generator 62c in the preferred embodiment is comprised of x and y pixel location data which represents the actual video image location of each activated cursor formed by a small grid of pixels (7 vertically by 5 horizontally) where that cursor is to be located. In particular, this location data enables cursor overlay circuit 60 to replace those few pixels of the video image data for the film frame being viewed which are located at these pixel locations (i.e., those at which the image of cursor 1 or cursor 2 is to be overlaid), by the image of the cursor or cursors themselves.

In the preferred embodiment of the present invention, cursor image generator 62c is implemented by circuitry comprised of standard components (such as 8254 counter/timer devices, 74LS191 counters, and a programmable PAL). By synchronizing its timing to the simultaneously occurring process of reading the video image data from frame memory 16 to video output circuit 20, this cursor image location generation circuitry determines when the video data for each pixel location at which one of the cursor images is to be overlaid (based on the location information supplied by cursor 1 locator 62a and cursor 2 locator 62b) is being transferred through cursor overlay circuit 60, and, when it is, that video data is replaced by video data representing a point of bright intensity (white). In this manner, the resultant video image is identical to the video image of the film frame being viewed except for the few pixels which contain the bright white image of the cursor or cursors (whose image is a cross-hatch pattern in the preferred embodiment). However, cursor image generator 62c may alternatively be implemented by different means, such as software executed on a conventional general purpose or special purpose processor and/or different circuitry known to one of ordinary skill in the art, which provides cursor image location information to cursor overlay circuit 60.

Cursor overlay circuit 60 is coupled to video enhancement circuit 18 and cursor image generator 62c, and is adapted to replace those pixels of the video image data which are located at positions at which the image of each of cursor 1 and cursor 2 are to be located with video data representing a point of bright intensity. The cursor overlay circuit receives an input signal from the cursor image generator indicating whether to merely pass the video data for the current pixel of the image of the film frame being viewed, or to replace the video data for that pixel with the video data representing the white cursor. In this manner, the resultant video image is identical to the video image of the film frame being viewed, except for the fact that the cursor or cursors have been overlaid onto the image.

Zoom position sensor 37 is coupled to camera zoom lens 361 of camera 36, and is adapted to determine the zoom setting of the lens. In particular, the zoom position sensor supplies as output the magnification factor provided by the zoom lens. In the preferred embodiment, zoom position sensor 37 is comprised of a conventional potentiometer, but may alternatively be implemented by other circuitry familiar to those of ordinary skill in the art.

Calibration and measurement processor 70 is coupled to cursor 1 locator 62a, cursor 2 locator 62b, keyboard 42, track ball 48 and zoom position sensor 37, and is adapted to determine relative or absolute physical distances between a pair of points on the video image on which the user has located cursor 1 and cursor 2 respectively. In particular, after having located the cursors at each of two respective points a known distance apart (e.g., across the known diameter of the image of a catheter in a cardiac catheterization laboratory application), the user may calibrate the system by using keyboard 42 to select a calibration mode, and then by adjusting track ball 48 to perform the calibration. More specifically, when the user selects calibration mode, an initial (arbitrary) distance is displayed on alphanumeric display 74. Then, as the user adjusts track ball 48, the distance displayed is modified in response to the track ball motion. When the distance displayed on alphanumeric display 74 agrees with the actual known physical distance between the two points located by the cursors, the user may "lock-in" the calibration via keyboard 42. Once this calibration has been performed, the system is enabled to accurately determine the distance between any other two points that the user wishes to measure. It will be appreciated that the physical distance between pixels in the vertical direction does not equal the physical distance between pixels in the horizontal direction, but, nonetheless, the relationship between these distances is fixed and known.

Calibration and measurement processor 70 is also responsive to the zoom setting of camera zoom lens 361 in the preferred embodiment. In particular, when the calibration operation is performed by the user, the then existing zoom setting (i.e., the magnification factor) is supplied to the calibration and measurement processor by zoom position sensor 37. The zoom setting is thus taken into account in determining the relationship between the distance between pixels in the image and the absolute physical distance between points in the subject of the image, by multiplying the distance between pixels determined without regard to the zoom setting times the magnification factor. In this manner, the resultant calibrated distance between pixels represents the distance between pixels for a x1 zoom setting (i.e., no magnification of the image). When the setting of camera zoom lens 361 is subsequently modified by the user and a measurement of the physical distance between two cursor locations is performed, calibration and measurement processor 70 readjusts the relationship between pixel distance and physical distance accordingly. In particular, the calibrated distance between pixels (as determined above) is multiplied by the pixel distance between the two cursor locations, and the result is divided by the magnification factor supplied by zoom position sensor 37 at the time of the measurement. Therefore, it is not necessary for the calibration operation to be performed again as a result of changes in the zoom setting.

After the calibration operation has been performed, the user may make measurements by moving the cursors to desired locations, and then selecting a measurement mode via keyboard 42. The system responds by displaying on alphanumeric display 74 the physical distance between the cursors. Furthermore, in the preferred embodiment, each time a measurement operation is performed, the system shown in FIG. 11 provides percent difference information with respect to the previous measurement. More specifically, the percentage by which the last measured distance is smaller than the previous measured distance is displayed on alphanumeric display 74. In angiographic applications, this may be used to determine an indication of the percentage of stenosis of a lumen by measuring the normal width of the lumen followed by the contracted width. Specifically, the formula used for determining percentage is $$1 - \frac{\text{Current Measurement}}{\text{Previous Measurement}} \times 100.$$

It is recognized that this information is available regardless of whether a calibration had been performed previously or not. In the preferred embodiment of the present invention, calibration and measurement processor 70 is implemented with software executed on the digital signal processor, but alternatively may be implemented with software executed on other special purpose or conventional general purpose processors, or by circuitry known to those of ordinary skill in the art.

Alphanumeric display 74 is conventional and is coupled to calibration and measurement processor 70 and is adapted to display to the user the calibration distance being adjusted and set by the user during the calibration mode, as well as the measured distance and/or relative percentage difference from a previous measurement during the measurement mode.

In operation of the preferred embodiment, the user, via keyboard 42, activates either cursor 1 positioning mode or cursor 2 positioning mode. This correspondingly enables either cursor 1 locator 62a or cursor 2 locator 62b to be responsive to track ball 48. Then, the user adjusts the location of the selected cursor via the track ball, and cursor image generator 62c generates cursor image location data which it supplies to cursor overlay circuit 60. The cursor overlay circuit thereby combines the video signal from frame memory 16 with the cursor image location data produced by cursor generator 62. The result is then provided to video output circuit 20, which produces the final video output for display on the video monitor.

The operation of the calibration and measurement functions are similar, except that in the calibration mode the user selects and locates cursor 1 and cursor 2 at two respective points separated by a known distance. Track ball 48 is used to calibrate the cursor display, namely to set the known distance, which provides calibration and measurement processor 70 with the necessary scale information to enable it to compute the physical distance between any two other points at which the cursors are placed subsequently. Flow charts representing the manner in which the calibration and measurement functions are performed are shown in detail in FIGS. 12A–12C.

Figure 12A:
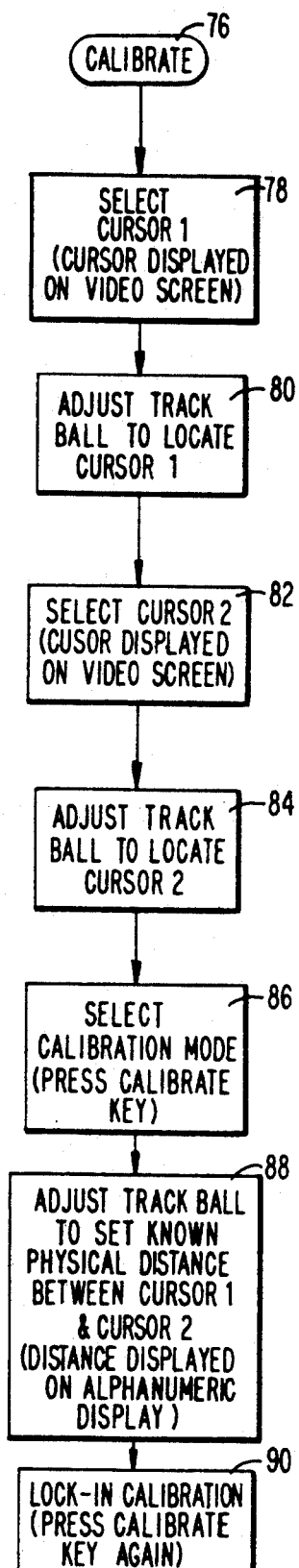
FIG. 12A–12C provide flow charts representing the manner in which the calibration and measurement functions are performed.

In particular, FIG. 12A represents a calibrate procedure 76. First, in step 78, the user selects cursor 1 via keyboard 42, thereby activating cursor 1 locator 62a and causing cursor image generator 62c and cursor overlay circuit 60 to display one overlaid cursor on the video image being viewed. Then, in step 80, the user adjusts track ball 48 to enable cursor 1 locator 62a to locate cursor 1 at a desired point which, preferably, is one of the two endpoints separated by a known distance. Next, in step 82, the user selects cursor 2 via keyboard 42, thereby activating cursor 2 locator 62b and causing cursor image generator 62c and cursor overlay circuit 60 to display both overlaid cursors on the video image being viewed. Then, in step 84, the user adjusts track ball 48 to enable cursor 2 locator 62b to locate cursor 2 at another desired point which, preferably, is at the other endpoint of the known distance. The calibration mode is then selected in step 86 by pressing the calibrate key on keyboard 42, and then track ball 48 is adjusted in step 88 to set the known physical distance between the locations of the two cursors. In one embodiment an initial assumed distance (in millimeters) is displayed on alphanumeric display 74, and the subsequent adjustment of the track ball causes the distance displayed to be changed accordingly. When the distance displayed on the alphanumeric display agrees with the known distance between the points located by the cursors, system calibration is "locked in" by pressing the calibrate key on the keyboard 42 once again as shown in step 90.

Figure 12B:
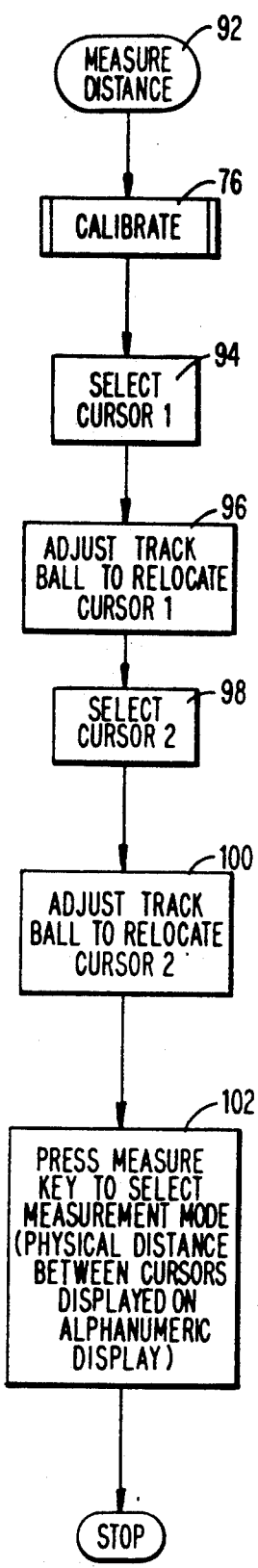

FIG. 12B represents a measurement procedure 92 by which the user may make a measurement to determine a physical distance. First, the user calibrates the cursor display system by performing calibration procedure 76. Next, in step 94, the user selects cursor 1 via keyboard 42, thereby activating cursor 1 locator 62a and causing cursor image generator 62c and cursor overlay circuit 60 to display an overlaid cursor 1 on the video image being viewed. Then, in step 96, the user adjusts track ball 48 to enable cursor 1 locator 62a to locate cursor 1 at a point which is one of the two endpoints of the distance to be measured. Next, in step 98, the user selects cursor 2 via keyboard 42, thereby activating cursor 2 locator 62b and causing cursor image generator 62c and cursor overlay circuit 60 to display both overlaid cursors on the video image being viewed. Then, in step 100, the user adjusts track ball 48 to enable cursor 2 locator 62b to locate cursor 2 at a point which is at the other endpoint of the distance to be measured. Measurement mode is then selected in step 102 by pressing the measure key on keyboard 42, and the system displays on alphanumeric display 74 the physical distance between the two points marked by the two cursors.

Figure 12C:
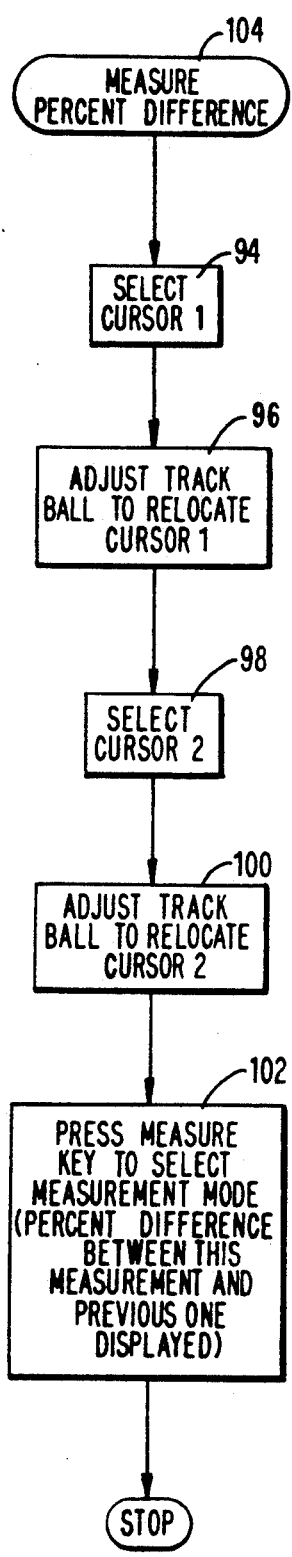

FIG. 12C represents a measurement procedure 104 by which the user may make a measurement to determine the percentage by which a measured distance is smaller than the previous measured distance. It will be seen that this procedure is substantially identical to measurement procedure 92 for the measurement of a physical distance, except that the user need not first calibrate the system. When the measurement mode is selected in step 102 by pressing the measure key on keyboard 42, the system displays on alphanumeric display 74 the percentage by which the measured distance is smaller than the distance measured the last time a measurement was made, according to the formula shown above. If no previous measurement was made, 100% is displayed.

Although the flowcharts of FIGS. 12A–12C represent the procedures to be followed to perform calibration and measurement in accordance with the preferred embodiment, the apparatus according to the present invention may be alternatively implemented in such a manner that other procedures apparent to those of ordinary skill in the art are used to accomplish these functions.

While particular embodiments of the present invention have been specifically illustrated and described, it is anticipated that various changes and modifications will be apparent to those skilled in the art, and that such changes may be made without departing from the scope of the invention as defined by the following claims.

What is claimed is:

1. Apparatus for generating video signals representing a photographic image previously recorded in a frame on a photographic film-type medium, comprising:
   film transport means for continuously transporting said film-type medium to and through an imaging location at a user selectable variable speed so as to position a film frame at said imaging location;
   film motion sensing means for sensing movement of the transported film-type medium and for producing pulses in response thereto;
   count means coupled to said film motion sensing means for counting said pulses and producing a trigger signal when a predetermined number of said pulses has been counted;
   pulsed image generating means responsive to said trigger signal for projecting an illuminated image of the film frame positioned at said imaging location;

video image pickup means optically coupled to said imaging location to receive the image of the film frame and for generating a video signal representing the film frame image; and signal output means coupled to said video image pickup means for producing an output video signal.

2. The apparatus of claim 1 wherein said pulsed image generating means includes strobe means responsive to said trigger signal for producing a flash of illuminating light at said imaging location to project an image of the film frame positioned thereat.

3. The apparatus of claim 1 wherein said pulsed image generating means includes illuminating means for producing an illuminated image and shuttering means optically coupled to said illuminating means and responsive to said trigger signal for projecting an image of transitory duration of the film frame positioned at said imaging location.

4. The apparatus of claim 1 further comprising means for inhibiting said pulsed image generating means from projecting said illuminated image of said film frame during intervals when said video image pickup means is unable to generate said video signal representing said film frame image.

5. The apparatus of claim 1 further comprising:

video signal adjustment means for modifying the video signal representing said film frame image; and pulsed image repeating means coupled to said pulsed image generating means for enabling said pulsed image generating means to repetitively project the illuminated image of said film frame during intervals when the video signal representing said film frame image is modified by said video signal adjustment means while said film frame remains fixed at said imaging location.

6. The apparatus of claim 5 wherein said video signal adjustment means comprises optical zoom means for zooming in and out on said photographic image.

7. The apparatus of claim 5 wherein said video signal adjustment means comprises optical panning means for panning said photographic image.

8. The apparatus of claim 5 wherein said video signal adjustment means comprises gamma adjustment means for enhancing the video signal representing said film frame image; and wherein said gamma adjustment means is comprised of a plurality of gamma adjustment circuits, and selection means operable by a user for selecting one of said gamma adjustment circuits.

9. The apparatus of claim 1 wherein said film transport means includes sprocket drive means coupled to said film-type medium for transporting said film frame to and through and for positioning said film frame at said imaging location.

10. The apparatus of claim 1 wherein said signal output means includes gamma adjustment means for enhancing the video signal representing said film frame image.

11. The apparatus of claim 10 wherein said gamma adjustment means is comprised of a plurality of gamma adjustment circuits, and selection means operable by a user for selecting one of said gamma adjustment circuits.

* * * * *